US012175921B2

(12) United States Patent
Kwon et al.

(10) Patent No.: US 12,175,921 B2
(45) Date of Patent: Dec. 24, 2024

(54) DISPLAY DEVICE

(71) Applicants: SAMSUNG DISPLAY CO., LTD., Yongin-si (KR); IUCF-HYU (INDUSTRY-UNIVERSITY COOPERATION FOUNDATION HANYANG UNIVERSITY), Seoul (KR)

(72) Inventors: Oh-Kyong Kwon, Seoul (KR); Minjae Jeong, Hwaseong-si (KR); Kyunghoon Chung, Yongin-si (KR)

(73) Assignees: SAMSUNG DISPLAY CO., LTD., Yongin-si (KR); IUCF-HYU (INDUSTRY-UNIVERSITY COOPERATION FOUNDATION HANYANG UNIVERSITY), Seoul (KR)

( * ) Notice: Subject to any disclaimer, the term of this patent is extended or adjusted under 35 U.S.C. 154(b) by 177 days.

(21) Appl. No.: 17/734,320

(22) Filed: May 2, 2022

(65) Prior Publication Data

US 2023/0005418 A1 Jan. 5, 2023

(30) Foreign Application Priority Data

Jul. 2, 2021 (KR) ........................ 10-2021-0087185

(51) Int. Cl.
*G09G 3/32* (2016.01)

(52) U.S. Cl.
CPC ....... *G09G 3/32* (2013.01); *G09G 2310/0267* (2013.01); *G09G 2310/08* (2013.01); (Continued)

(58) Field of Classification Search
CPC ...... G09G 3/32; G09G 3/3225; G09G 3/3233; G09G 3/3266; G09G 2300/0413; (Continued)

(56) References Cited

U.S. PATENT DOCUMENTS 7,414,599 B2 8/2008 Chung et al.
9,460,662 B2 10/2016 Lee et al.
(Continued)

FOREIGN PATENT DOCUMENTS

EP 3 367 372 8/2018
EP 3462437 4/2019
(Continued)

OTHER PUBLICATIONS

S.M. Choi et al., "A Self-compensated Voltage Programming Pixel Structure for Active-Matrix Organic Light Emitting Diodes", IDW '03, 2003.
(Continued)

*Primary Examiner* — Nelson M Rosario

(57) ABSTRACT

A display device is provided including a display panel. A pixel of the display panel includes a light emitting element, first through sixth transistors, and a capacitor. The first transistor is connected between a power line and the light emitting element and operates depending on a potential of a first node. The second transistor is connected between a data line and a second node. The capacitor is connected between the first node and the second node. The third transistor is connected between the first transistor and the first node. The fourth transistor is connected between the first node and a reference voltage line. The fifth transistor is connected between the second node and the reference voltage line. The sixth transistor is connected between the power line and the second node.

25 Claims, 16 Drawing Sheets

(52) U.S. Cl.
CPC ................. *G09G 2330/021* (2013.01); *G09G 2340/0435* (2013.01)

(58) Field of Classification Search
CPC ... G09G 2300/0819; G09G 2300/0861; G09G 2310/0216; G09G 2310/0262; G09G 2310/0264; G09G 2310/0267; G09G 2310/061; G09G 2310/08; G09G 2320/02; G09G 2330/021; G09G 2340/0435; G09G 3/3275
See application file for complete search history.

(56) References Cited

U.S. PATENT DOCUMENTS

| | | | | |
|---|---|---|---|---|
| 10,004,124 | B1 * | 6/2018 | Ko | G09G 3/3233 |
| 10,861,393 | B2 * | 12/2020 | Kim | G09G 3/3266 |
| 2016/0232836 | A1 * | 8/2016 | Yang | G09G 3/3233 |
| 2021/0049965 | A1 | 2/2021 | Jeon et al. | |

FOREIGN PATENT DOCUMENTS

| | | |
|---|---|---|
| KR | 10-0560780 | 3/2006 |
| KR | 10-2020-0067584 | 6/2020 |
| KR | 10-2185361 | 12/2020 |
| KR | 10-2021-0019635 | 2/2021 |

OTHER PUBLICATIONS

Chih-Lung Lin, et al., "Pixel Circuit With Leakage Prevention Scheme for Low-Frame-Rate Amoled Displays", Journal of the Electron Devices Society, vol. 8, 2020.

Nack-Hyeon Keum, et al., "An AMOLED Pixel Circuit With a Compensating Scheme for Variations in Subthreshold Slope and Threshold Voltage of Driving TFTs", IEEE Journal of Solid-State Circuits, vol. 55, No. 11, Nov. 2020.

Partial European Search Report dated Oct. 17, 2022 in corresponding European Application No. 22182448.5.

* cited by examiner

DISPLAY DEVICE

CROSS-REFERENCE TO RELATED APPLICATIONS

This U.S. non-provisional patent application claims priority under 35 U.S.C. § 119 to Korean Patent Application No. 10-2021-0087185 filed on Jul. 2, 2021, in the Korean Intellectual Property Office, the disclosures of which are incorporated by reference in their entireties herein.

1. TECHNICAL FIELD

Embodiments of the present disclosure described herein relate to a display device, and more particularly, relate to a display device with increased display quality.

2. DISCUSSION OF RELATED ART

A light emitting display device may display an image by using a light emitting diode that emits light by recombination of electrons and holes. The light emitting display device may have a fast response speed and consume less power than traditional cathode ray type (CRT) display devices.

The light emitting display device includes pixels connected to data lines and scan lines. Each of the pixels may include a light emitting diode and a circuit unit for controlling an amount of current flowing to the light emitting diode. The circuit unit controls an amount of current flowing through the light emitting diode in response to a data signal. Light having a predetermined luminance is generated in response to the amount of current flowing through the light emitting diode.

However, when a light emitting display device is driven at a high-speed and a frequency of the driving changes, display quality may deteriorate.

SUMMARY

At least one embodiment of the present disclosure provides a display device with increased display quality even when a change in driving frequency occurs during high-speed driving.

According to an embodiment of the present disclosure, a display device includes a display panel. A pixel of the display panel includes a light emitting element, first through sixth transistors, and a capacitor. The first transistor is connected between a power line and the light emitting element and operates depending on a potential of a first node. The second transistor is connected between a data line and a second node and receives a first scan signal. The capacitor is connected between the first node and the second node. The third transistor is connected between the first transistor and the first node and receives a second scan signal. The fourth transistor is connected between the first node and a reference voltage line and receives a third scan signal. The fifth transistor is connected between the second node and the reference voltage line and receives a first emission control signal. The sixth transistor is connected between the power line and the second node and receives a fourth scan signal.

According to an embodiment of the present disclosure, a display device includes a display panel and a panel driver that drives the display panel at a first panel frequency in a first driving mode and drives the display panel at a second panel frequency lower than the first panel frequency in a second driving mode. The panel driver includes a first scan driver operating at a first frequency, a second scan driver operating at a second frequency higher than the first frequency, and an emission control driver operating at a third frequency higher than the first frequency. The display panel displays an image during a plurality of frame periods, and in the second driving mode, each frame periods includes a writing period and a holding period, the first scan driver is activated during the writing period and is deactivated during the holding period, and the second scan driver and the emission control driver are activated during the writing period and the holding period.

BRIEF DESCRIPTION OF THE FIGURES

The above and other objects and features of the present disclosure will become apparent by describing in detail embodiments thereof with reference to the accompanying drawings.

DETAILED DESCRIPTION

Figure 1:
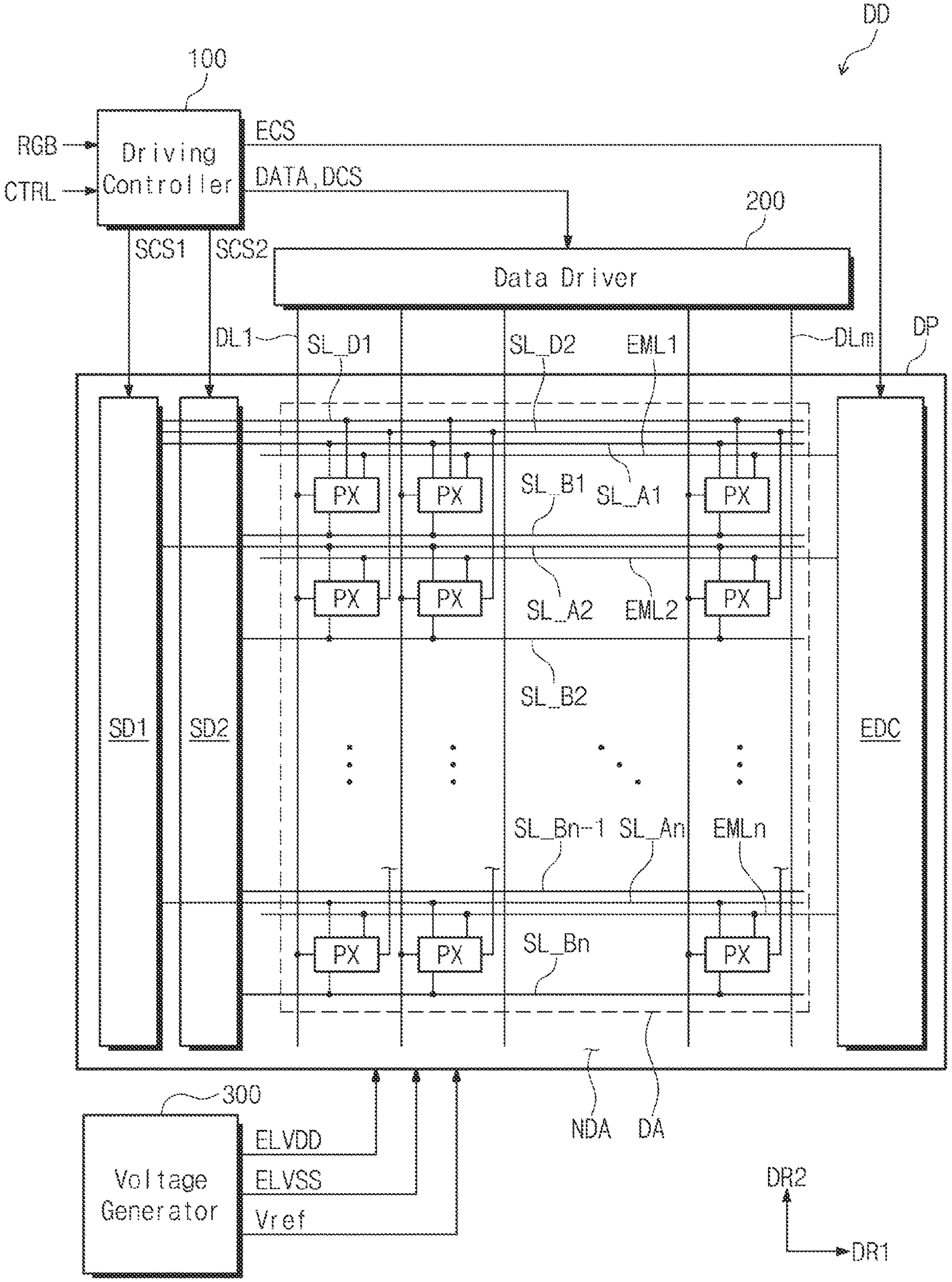
FIG. 1 is a block diagram of a display device according to an embodiment of the present disclosure.

In the specification, when one component (or area, layer, part, or the like) is referred to as being "on", "connected to", or "coupled to" another component, it should be understood that the former may be directly on, connected to, or coupled to the latter, and also may be on, connected to, or coupled to the latter via a third intervening component.

Like reference numerals refer to like components. The term "and/or" includes one or more combinations of the associated listed items.

The terms "first", "second", etc. are used to describe various components, but the components are not limited by the terms. The terms are used only to differentiate one component from another component. For example, a first component may be named as a second component, and vice versa, without departing from the spirit or scope of the present disclosure. A singular form, unless otherwise stated, includes a plural form.

Also, the terms "under", "beneath", "on", "above" are used to describe a relationship between components illustrated in a drawing. The terms are relative and are described with reference to a direction indicated in the drawing.

Hereinafter, embodiments of the present disclosure will be described with reference to accompanying drawings.

FIG. 1 is a block diagram of a display device according to an embodiment of the present disclosure.

Referring to FIG. 1, a display device DD may be a device that is activated in response to an electrical signal to display an image. The display device DD may be applied to electronic devices such as a smart watch, a tablet, a notebook computer, a computer, and a smart television.

The display device DD includes a display panel DP, a panel driver, and a driving controller 100 (e.g., a control circuit). As an example of the present disclosure, the panel driver includes a data driver 200 (e.g., a driver circuit), scan drivers SD1 and SD2 (e.g., driver circuits), an emission control driver EDC (e.g., driver circuit), and a voltage generator 300 (e.g., a voltage generator circuit).

The driving controller 100 receives an image signal RGB and a control signal CTRL. The driving controller 100 generates an image data signal DATA by converting a data format of the image signal RGB to satisfy a specification of an interface with the data driver 200. The driving controller 100 outputs scan control signals SCS1 and SCS2, a data control signal DCS, and an emission driving signal ECS. The scan control signals SCS1 and SCS2 may include a first scan control signal SCS1 and a second scan control signal SCS2.

The data driver 200 receives the data control signal DCS and the image data signal DATA from the driving controller 100. The data driver 200 converts the image data signal DATA into data signals and outputs the data signals to a plurality of data lines DL1 to DLm to be described later. The data signals are analog voltages corresponding to a grayscale value of the image data signal DATA.

The scan drivers SD1 and SD2 may include a first scan driver SD1 and a second scan driver SD2. The first scan driver SD1 receives the first scan control signal SCS1 from the driving controller 100, and the second scan driver SD2 receives the second scan control signal SCS2 from the driving controller 100. The first scan driver SD1 may output low frequency scan signals in response to the first scan control signal SCS1, and the second scan driver SD2 may output high frequency scan signals in response to the second scan control signal SCS2.

The voltage generator 300 generates voltages used for an operation of the display panel DP. In an embodiment, the voltage generator 300 generates a first driving voltage ELVDD, a second driving voltage ELVSS, and a reference voltage Vref.

The display panel DP includes low frequency scan lines SL_A1 to SL_An, high frequency scan lines SL_B1 to SL_Bn, emission control lines EML1 to EMLn, the data lines DL1 to DLm, and pixels PX. The low frequency scan lines SL_A1 to SL_An, the high frequency scan lines SL_B1 to SL_Bn, the emission control lines EML1 to EMLn, the data lines DL1 to DLm, and the pixels PX are disposed in a display area DA. The low frequency scan lines SL_A1 to SL_An, the high frequency scan lines SL_B1 to SL_Bn, and the emission control lines EML1 to EMLn extend in a first direction DR1. The low frequency scan lines SL_A1 to SL_An, the high frequency scan lines SL_B1 to SL_Bn, and the emission control lines EML1 to EMLn are arranged to be spaced apart from each other in a second direction DR2. The second direction DR2 may be a direction crossing the first direction DR1. The data lines DL1 to DLm extend in the second direction DR2 and are arranged to be spaced apart from each other in the first direction DR1.

The pixels PX are electrically connected to the low frequency scan lines SL_A1 to SL_An, the high frequency scan lines SL_B1 to SL_Bn, the emission control lines EML1 to EMLn, and the data lines DL1 to DLm, respectively. Each of the pixels PX may be electrically connected to three scan lines. For example, as illustrated in FIG. 1, pixels in a first row may be connected to the first low frequency scan line SL_A1, a first dummy scan line SL_D1, and the first high frequency scan line SL_B1. Also, the pixels in the second row may be connected to the second low frequency scan line SL_A2, a second dummy scan line SL_D2, and the second high frequency scan line SL_B2. The first dummy scan line SL_D1 may be activated to precede the first low frequency scan line SL_A1 by a period of 2H (e.g., two horizontal periods), and the second dummy scan line SL_D2 may be activated to precede the first low frequency scan line SL_A1 by a period of 1H (e.g., one horizontal period). A duration of the period of 1H may correspond to a duration of an active period of one low frequency scan line. The first and second dummy scan lines SL_D1 and SL_D2 may be connected to the first scan driver SD1. In an embodiment, a set of the scan lines (e.g., the high frequency scan line or the low frequency scan lines) are driven sequentially during a frame period so that each scan line experiences one active period during which pixels connected to the corresponding scan line receive a data voltage.

The first and second scan drivers SD1 and SD2 may be disposed in a non-display area NDA of the display panel DP. The first scan driver SD1 outputs the low frequency scan signals to the low frequency scan lines SL_A1 to SL_An in response to the first scan control signal SCS1. The second scan driver SD2 outputs the high frequency scan signals to the high frequency scan lines SL_B1 to SL_Bn in response to the second scan control signal SCS2. In detail, the first scan driver SD1 may drive the first and second dummy scan lines SL_D1 and SL_D2 and the low frequency scan lines SL_A1 to SL_An at a first frequency in response to the first scan control signal SCS1. The second scan driver SD2 may drive the high frequency scan lines SL_B1 to SL_Bn at a second frequency in response to the second scan control signal SCS2. In an embodiment, the second frequency is greater than the first frequency.

The emission control driver EDC receives the emission driving signal ECS from the driving controller 100. The emission control driver EDC may output emission control signals to the emission control lines EML1 to EMLn in response to the emission driving signal ECS. The emission control driver EDC may drive the emission control lines EML1 to EMLn at a third frequency in response to the emission driving signal ECS. In an embodiment, the third frequency is greater than the first frequency. In an embodiment of the present disclosure, the third frequency is the same as the second frequency.

The emission control driver EDC may be disposed in the non-display area NDA of the display panel DP. As an example of the present disclosure, the first and second scan drivers SD1 and SD2 may be disposed adjacent to a first side of the display area DA, and the emission control driver EDC may be disposed adjacent to a second side of the display area DA. In other words, the display area DA may be provided between the first and second scan drivers SD1 and SD2 and the emission control driver EDC. However, the present disclosure is not limited thereto. For example, the emission control driver EDC may be disposed adjacent to the first side of the display area DA together with the first and second scan drivers SD1 and SD2, or the first scan driver SD1 may be disposed adjacent to the first side of the display area DA, and the second scan driver SD2 and the emission control driver EDC may be disposed adjacent to the second side of the display area DA.

Each of the pixels PX includes a light emitting element ED (refer to FIG. 2) and a pixel circuit controlling emission of the light emitting element ED. The pixel circuit may include a plurality of transistors and a capacitor. At least one of the first and second scan drivers SD1 and SD2 and the emission control driver EDC may include transistors fabricated through a same process as that of the pixel circuit.

Each of the pixels PX may receive a first driving voltage ELVDD, a second driving voltage ELVSS, and the reference voltage Vref from the voltage generator 300. In an embodiment, the second driving voltage ELVSS is less than the first driving voltage ELVDD.

Figure 2:
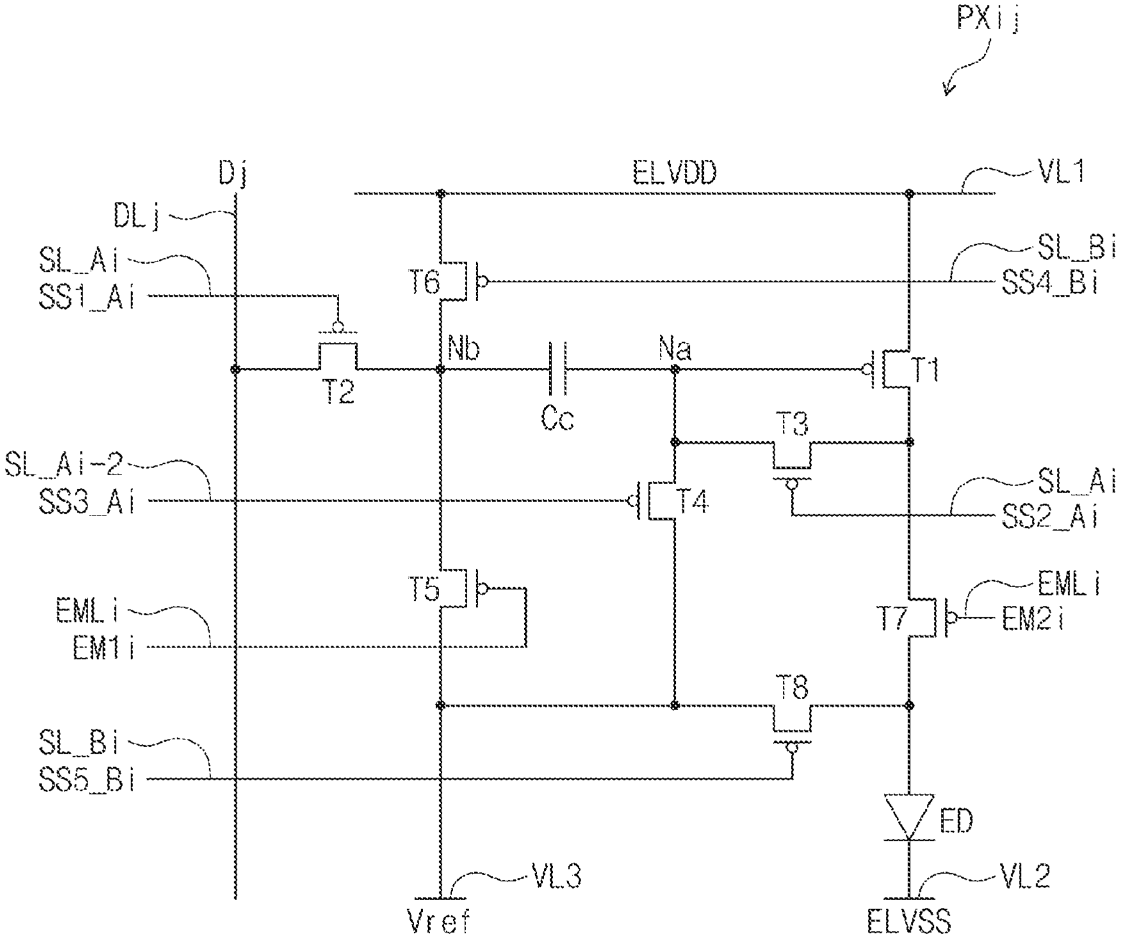
FIG. 2 is a circuit diagram of a pixel according to an embodiment of the present disclosure.

FIG. 2 is a circuit diagram of a pixel according to an embodiment of the present disclosure.

FIG. 2 illustrates an equivalent circuit diagram of one pixel PXij among the pixels PX illustrated in FIG. 1. Since each of the plurality of pixels PX has the same circuit structure, a detailed description of the remaining pixels will be omitted as a description of the circuit structure of the pixel PXij.

Referring to FIG. 2, the pixel PXij is connected to a j-th data line DLj (hereinafter, referred to as a data line) among the data lines DL1 to DLm, an i-th low frequency scan line SL_Ai (hereinafter, referred to as a low frequency scan line) among the low frequency scan lines SL_A1 to SL_An, a i-2th low frequency scan line SL_Ai-2 (hereinafter, referred to as a previous low frequency scan line) among the low frequency scan lines SL_A1 to SL_An, an i-th high frequency scan line SL_Bi (hereinafter, referred to as a high frequency scan line) among the high frequency scan lines SL_B1 to SL_Bn, and an i-th emission control line EMLi (hereinafter, referred to as an emission control line) among the emission control lines EML1 to EMLn.

The pixel PXij includes the light emitting element ED and the pixel circuit. The pixel circuit includes first to eighth transistors T1, T2, T3, T4, T5, T6, T7, and T8, and one capacitor Cc. Each of the first to eighth transistors T1 to T8 may be a transistor having a low-temperature polycrystalline silicon (LTPS) semiconductor layer. The first to eighth transistors T1 to T8 may be formed of the same type of transistors. As an example of the present disclosure, each of the first to eighth transistors T1 to T8 may be a P-type transistor. The configuration of the pixel circuit according to the present disclosure is not limited to the embodiment illustrated in FIG. 2. The pixel circuit illustrated in FIG. 2 is only an example, and the configuration of the pixel circuit may be modified. For example, each of the first to eighth transistors T1 to T8 may be an N-type transistor. In addition, some of the first to eighth transistors T1 to T8 may be P-type transistors, and the rest of the first to eighth transistors T1 to T8 may be N-type transistors. Alternatively, at least one of the first to eighth transistors T1 to T8 may be a transistor having an oxide semiconductor layer. For example, each of the third and fourth transistors T3 and T4 may be an oxide semiconductor transistor, and each of the first, second, fifth to eighth transistors T1, T2, T5 to T8 may be an LTPS transistor.

The first transistor T1 may be connected between a first power line VL1 and an anode of the light emitting element ED. The first transistor T1 includes a first electrode connected to the first power line VL1, a second electrode electrically connected to the anode of the light emitting element ED through the seventh transistor T7, and a third electrode (e.g., a gate electrode) connected to a first node Na. The first power line VL1 may transfer the first driving voltage ELVDD to the pixel PXij. The first transistor T1 may operate depending on a potential (e.g., a voltage) of the first node Na.

The second transistor T2 may be connected between the data line DLj and a second node Nb. The second transistor T2 includes a first electrode connected to the data line DLj, a second electrode connected to the second node Nb, and a third electrode (e.g., a gate electrode) receiving a first scan signal SS1_Ai. The third electrode of the second transistor T2 may be electrically connected to the low frequency scan line SL_Ai. Accordingly, the second transistor T2 may receive an i-th low frequency scan signal transferred from the low frequency scan line SL_Ai as the first scan signal SS1_Ai. The second transistor T2 may be turned on in response to the first scan signal SS1_Ai to transfer the data signal Dj transferred from the data line DLj to the second node Nb. As an example of the present disclosure, the data signal Dj may be a data voltage Vdata (refer to FIG. 4) including or representing grayscale information.

The capacitor Cc is connected between the first node Na and the second node Nb. In detail, a first electrode of the capacitor Cc is connected to the first node Na, and a second electrode of the capacitor Cc is connected to the second node Nb.

The third transistor T3 is connected between the first node Na and the first transistor T1. The third transistor T3 includes a first electrode connected to the first node Na, a second electrode connected to the second electrode of the first transistor T1, and a third electrode (e.g., a gate electrode) receiving a second scan signal SS2_Ai. As an example of the present disclosure, the third electrode of the third transistor T3 may be electrically connected to the low frequency scan line SL_Ai. Accordingly, the third transistor T3 may receive the i-th low frequency scan signal transferred from the low frequency scan line SL_Ai as the second scan signal SS2_Ai. That is, the first and second scan signals SS1_Ai and SS2_Ai may be activated at the same time. The third transistor T3 may be turned on in response to the second scan signal SS2_Ai to electrically connect the first node Na to the second electrode of the first transistor T1. The first transistor T1 may be diode-connected by the third transistor T3 that is turned-on.

The fourth transistor T4 is connected between the first node Na and a reference voltage line VL3. The fourth transistor T4 includes a first electrode connected to the reference voltage line VL3, a second electrode connected to the first node Na, and a third electrode receiving a third scan signal SS3_Ai. The reference voltage line VL3 may transfer a reference voltage Vref to the pixel PXij. The third electrode (e.g., a gate electrode) of the fourth transistor T4 may be electrically connected to the previous low frequency scan line SL_Ai-2. Accordingly, the fourth transistor T4 may receive an i-2th low frequency scan signal transferred from the previous low frequency scan line SL_Ai-2 as the third scan signal SS3_Ai. The fourth transistor T4 is turned on in response to the third scan signal SS3_Ai to transfer the reference voltage Vref to the first node Na, and may perform an initialization operation for initializing the first node Na.

The fifth transistor T5 is connected between the second node Nb and the reference voltage line VL3. The fifth transistor T5 includes a first electrode connected to the reference voltage line VL3, a second electrode connected to the second node Nb, and a third electrode (e.g., a gate electrode) receiving a first emission control signal EM1*i*. The third electrode of the fifth transistor T5 may be electrically connected to the emission control line EMLi. Accordingly, the fifth transistor T5 may receive an i-th emission control signal transferred from the emission control line EMLi as the first emission control signal EM1*i*. The fifth transistor T5 may be turned on in response to the first emission control signal EM1*i* to initialize the second node Nb to the reference voltage Vref.

The sixth transistor T6 is connected between the second node Nb and the first power line VL1. The sixth transistor T6 includes a first electrode connected to the first power line VL1, a second electrode connected to the second node Nb, and a third electrode (e.g., a gate electrode) receiving a fourth scan signal SS4_Bi. The third electrode of the sixth transistor T6 may be electrically connected to the high frequency scan line SL_Bi. Accordingly, the sixth transistor T6 may receive an i-th high frequency scan signal transferred from the high frequency scan line SL_Bi as the fourth scan signal SS4_Bi. The sixth transistor T6 may be turned on in response to the fourth scan signal SS4_Bi to apply the first driving voltage ELVDD to the second node Nb.

The seventh transistor T7 is connected between the anode of the light emitting element ED and the first transistor T1. The seventh transistor T7 includes a first electrode connected to the second electrode of the first transistor T1, a second electrode connected to the anode of the light emitting element ED, and a third electrode (e.g., a gate electrode) receiving a second emission control signal EM2*i*. The third electrode of the seventh transistor T7 may be electrically connected to the emission control line EMLi. Accordingly, the seventh transistor T7 may receive the i-th emission control signal transferred from the emission control line EMLi as the second emission control signal EM2*i*. That is, the first and second emission control signals EM1*i* and EM2*i* may be activated at the same time. The seventh transistor T7 may be turned on in response to the second emission control signal EM2*i* to supply a current flowing through the first transistor T1 to the light emitting element ED.

The eighth transistor T8 is connected between the anode of the light emitting element ED and the reference voltage line VL3. The eighth transistor T8 includes a first electrode connected to the reference voltage line VL3, a second electrode connected to the anode of the light emitting element ED, and a third electrode (e.g., a gate electrode) receiving a fifth scan signal SS5_Bi. The third electrode of the eighth transistor T8 may be electrically connected to the high frequency scan line SL_Bi. Accordingly, the eighth transistor T8 may receive the i-th high frequency scan signal transferred from the high frequency scan line SL_Bi as the fifth scan signal SS5_Bi. That is, the fourth and fifth scan signals SS4_Bi and SS4_Bi may be simultaneously activated. The eighth transistor T8 may be turned on in response to the fifth scan signal SS5_Bi to initialize the anode of the light emitting element ED to the reference voltage Vref.

The anode of the light emitting element ED may be connected to the second electrode of the seventh transistor T7 and the second electrode of the eighth transistor T8, and the cathode of the light emitting element ED may be connected to a second power line VL2. The second power line VL2 may transfer the second driving voltage ELVSS to the pixel PXij. In an embodiment, the reference voltage Vref has a lower voltage level than the second driving voltage ELVSS.

The first to third scan signals SS1_Ai, SS2_Ai, and SS3_Ai are low frequency scan signals output from the first scan driver SD1 operating at the first frequency, and the fourth and fifth scan signals SS4_Bi and SS5_Bi may be the high frequency scan signal output from the second scan driver SD2 operating at the second frequency. As an example of the present disclosure, each of the first and second scan signals SS1_Ai and SS2_Ai may be the i-th low frequency scan signal supplied from the low frequency scan line SL_Ai, and the third scan signal SS3_Ai may be the i-2th low frequency scan signal supplied from the previous low frequency scan line SL_Ai-2. Each of the fourth and fifth scan signals SS4_Bi and SS5_Bi may be the i-th high frequency scan signal supplied from the high frequency scan line SL_Bi. However, the present disclosure is not limited thereto. Alternatively, the first and second scan signals SS1_Ai and SS2_Ai may be signals supplied from different low frequency scan lines, and the fourth and fifth scan signals SS4_Bi and SS5_Bi may be signals supplied from different high frequency scan lines.

Figure 3A:
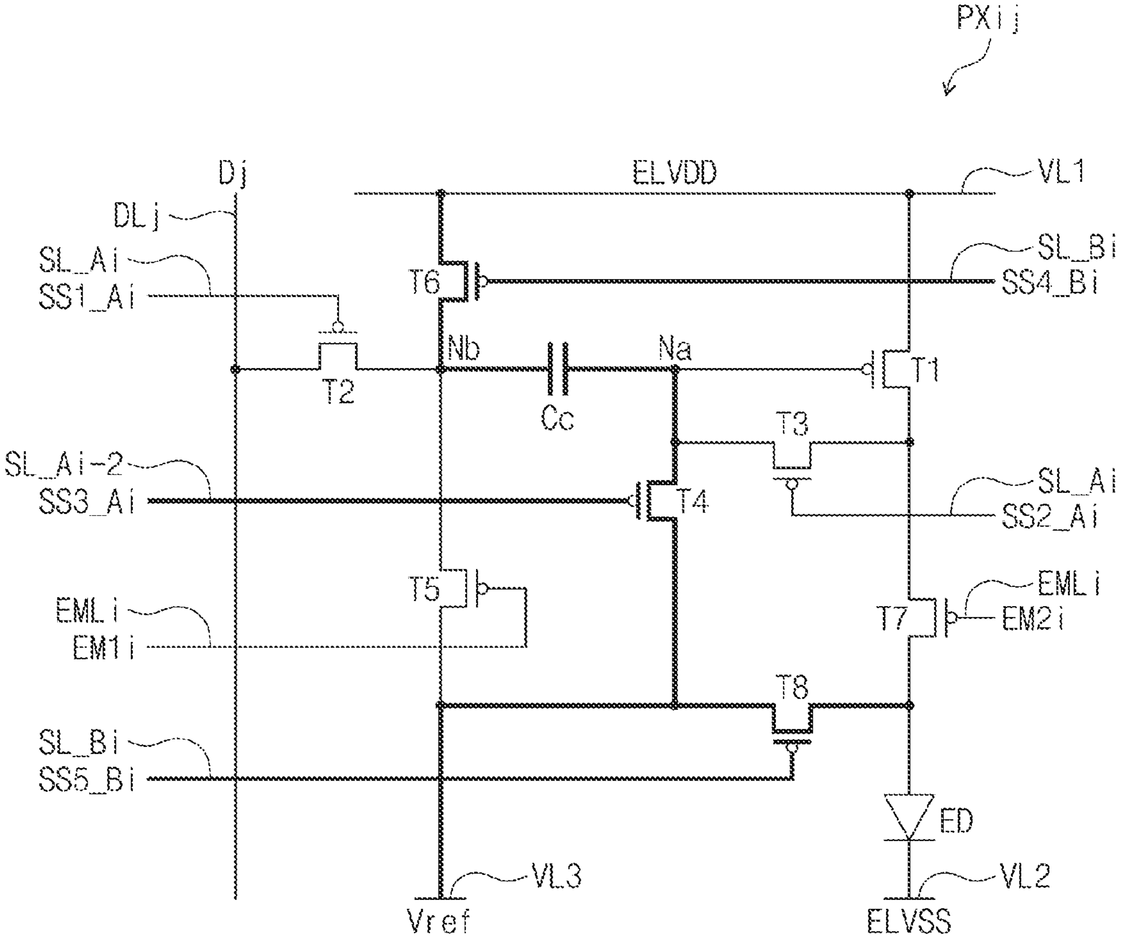
FIGS. 3A to 3C are circuit diagrams describing an operation of a pixel illustrated in FIG. 2.
Figure 3B:
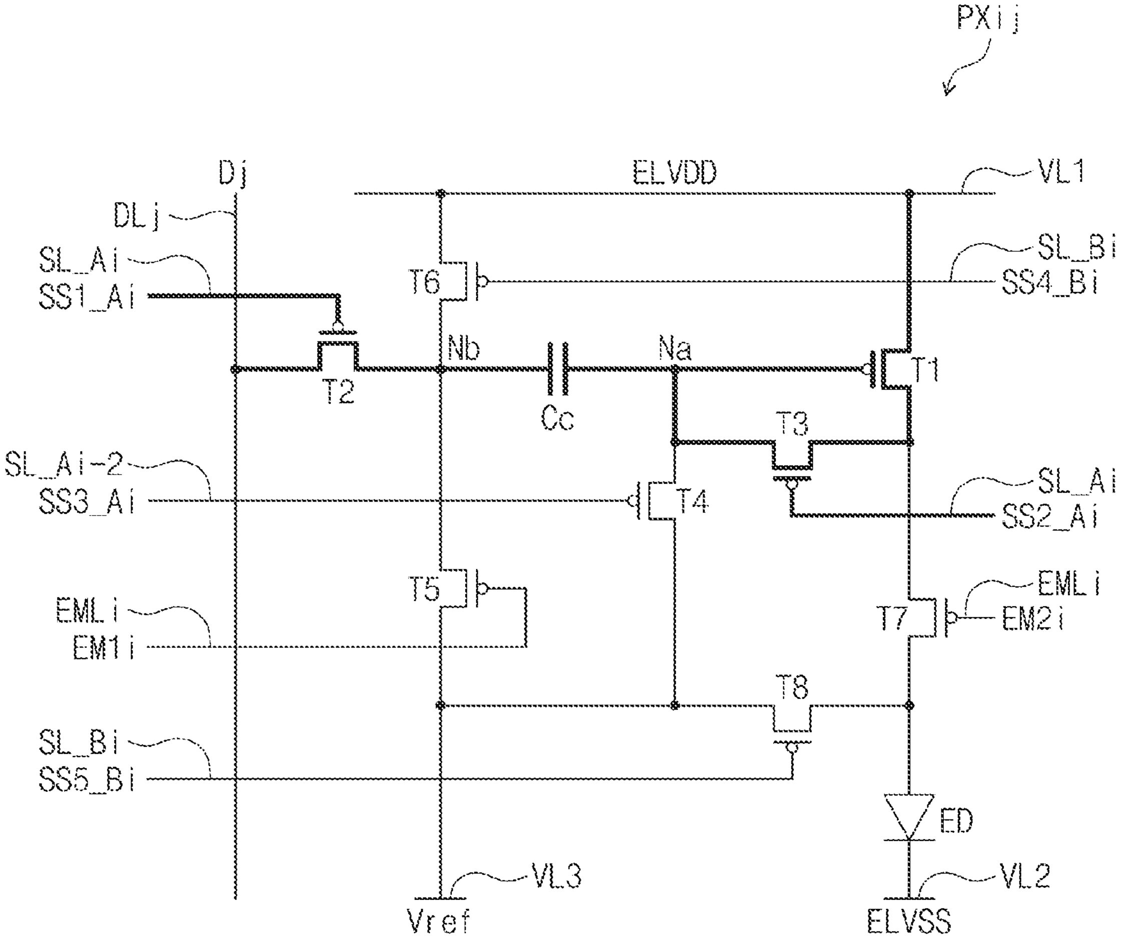
Figure 3C:
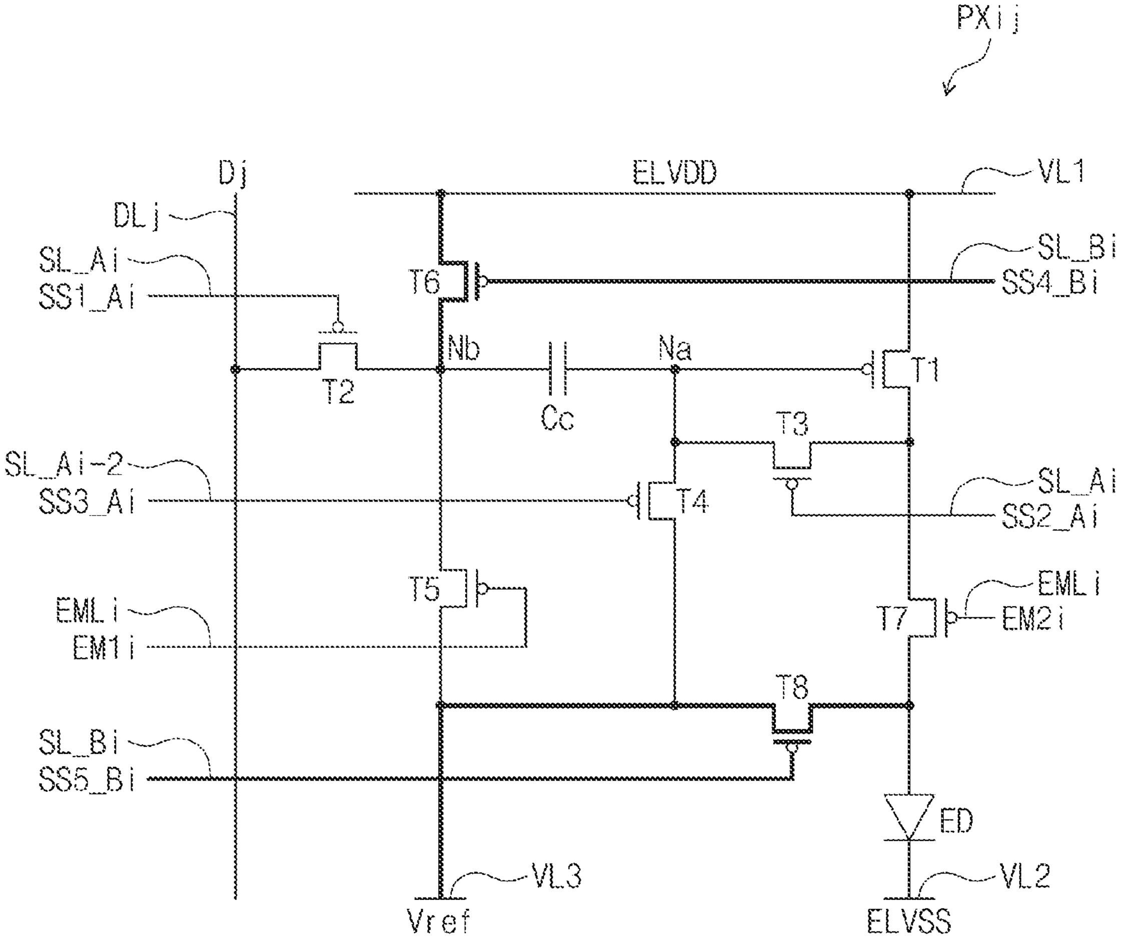
Figure 4:
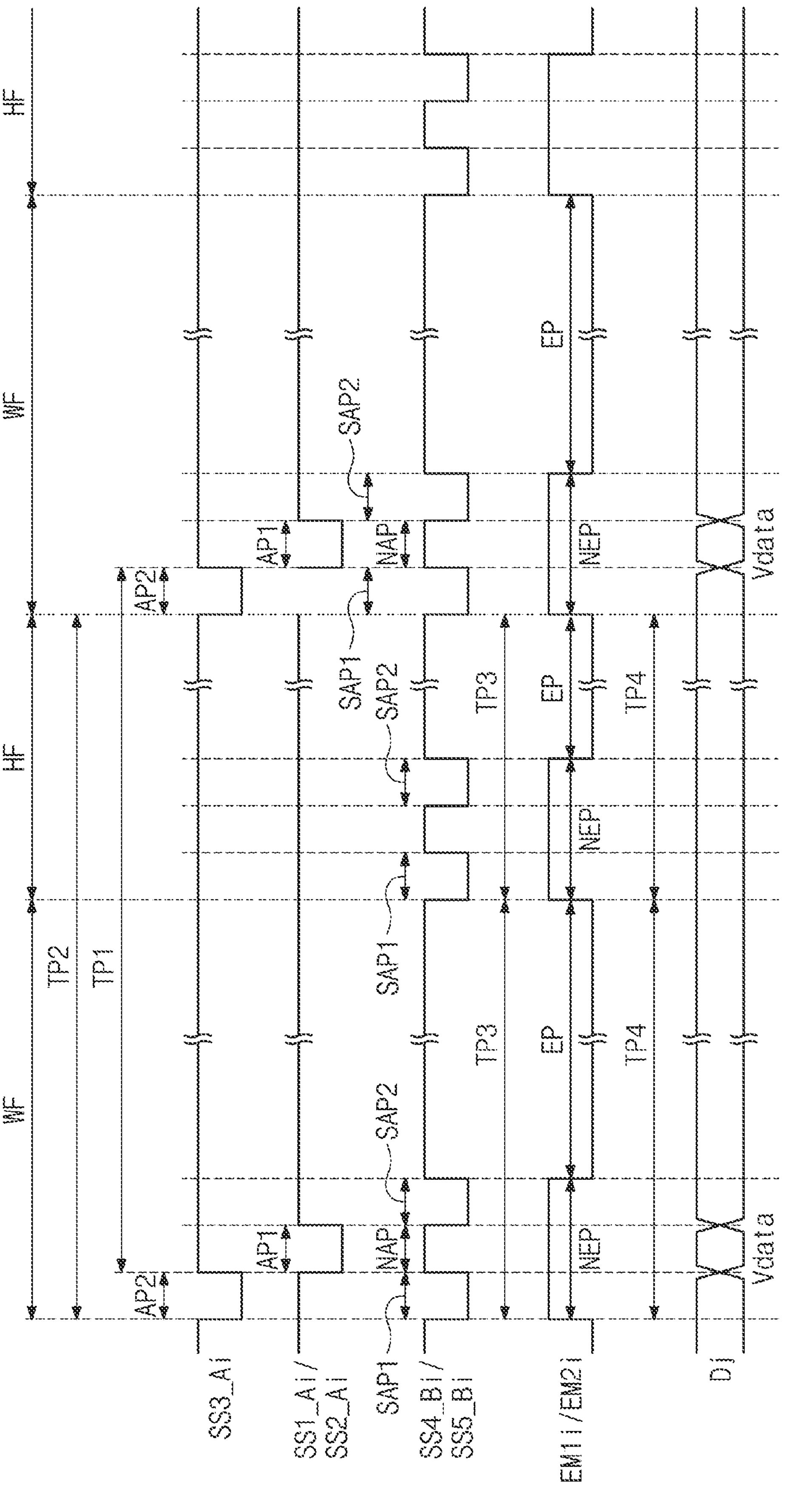
FIG. 4 is a timing diagram describing an operation of a pixel of FIG. 2 according to an embodiment of the present disclosure.

FIGS. 3A to 3C are circuit diagrams describing an operation of a pixel illustrated in FIG. 2, and FIG. 4 is a timing diagram describing an operation of a pixel illustrated in FIG. 2.

Referring to FIGS. 1, 3A to 3C, and 4, an operating frequency of the display panel DP may be referred to as a panel frequency. The panel driver may drive the display panel DP at any one of a plurality of first panel frequencies in a first driving mode, and may drive the display panel DP at any one of a plurality of second panel frequencies in the second driving mode. In an embodiment, each of the second panel frequencies is lower than the first panel frequencies. For example, each of the second panel frequencies may have a frequency of 1 Hz, 15 Hz, 30 Hz, or 40 Hz, and each of the first panel frequencies may have a frequency of 60 Hz, 120 Hz, 240 Hz, or 480 Hz.

In the first driving mode, the first scan driver SD1 operates at the first frequency, and the second scan driver SD2 operates at the second frequency equal to or higher than the first frequency. Also, in the first driving mode, the emission control driver EDC operates at the third frequency equal to or higher than the first frequency. In an embodiment, the first frequency has the same frequency as any one of the first panel frequencies, and each of the second and third frequencies has the highest frequency among the first panel frequencies used to drive the display panel DP during the first driving mode.

For example, when the display panel DP operates at 120 Hz during the first driving mode and the highest frequency among the first panel frequencies is 240 Hz, the first frequency may be 120 Hz, and each of the second and third frequencies may be 240 Hz. When the display panel DP operates at 240 Hz during the first driving mode and the highest frequency among the first panel frequencies is 240 Hz, each of the first to third frequencies may be 240 Hz.

In the second driving mode, the first scan driver SD1 operates at the first frequency, and the second scan driver SD2 operates at the second frequency higher than the first frequency. Also, in the second driving mode, the emission control driver EDC operates at the third frequency higher than the first frequency. In this embodiment, the first frequency has the same frequency as any one among the second panel frequencies, and each of the second and third frequencies has the highest frequency among the first panel frequencies.

For example, when the display panel DP operates at 30 Hz in the second driving mode and the highest frequency among the first panel frequencies is 240 Hz, the first frequency may be 30 Hz, and each of the second and third frequencies may be 240 Hz. When the display panel DP operates at 1 Hz during the second driving mode and the highest frequency among the first panel frequencies is 240 Hz, the first frequency may be 1 Hz, and each of the second and third frequencies may be 240 Hz.

In the second driving mode, the display panel DP may display an image during a plurality of frames (or frame periods). FIG. 4 illustrates two consecutive frames (or frame periods) among the plurality of frames (or frame periods) for convenience of description. Each of the frames (or frame periods) includes a writing frame WF (e.g., a writing period) and a holding frame HF (or a holding period).

In the writing frame WF, each of the first to third scan signals SS1_Ai, SS2_Ai, and SS3_Ai and the fourth and fifth scan signals SS4_Bi and SS5_Bi may be activated. In the holding frame HF, the fourth and fifth scan signals SS4_Bi and SS5_Bi may be activated, and the first to third scan signals SS1_Ai, SS2_Ai, and SS3_Ai may be deactivated. The first and second emission control signals EM1*i* and EM2*i* may be deactivated during a partial section of the writing frame WF and during a partial section of the holding frame HF.

In the second driving mode, the first to third scan signals SS1_Ai, SS2_Ai, and SS3_Ai may be output at the first frequency, and the fourth and fifth scan signals SS4_Bi and SS5_Bi may be output at the second frequency higher than the first frequency. Also, the first and second emission control signals EM1*i* and EM2*i* may be output at the third frequency higher than the first frequency. In this embodiment, the second and third frequencies may have the same magnitude with each other.

Referring to FIGS. 3A to 3C and 4, in the writing frame WF, each of the first and second emission control signals EM1*i* and EM2*i* may include a deactivation section NEP. The deactivation section NEP of each of the first and second emission control signals EM1*i* and EM2*i* is defined as a non-emission section in which the light emitting element ED does not emit light. An activation section EP of each of the first and second emission control signals EM1*i* and EM2*i* may be defined as an emission section in which the light emitting element ED emits light. As an example of the present disclosure, each of the first and second emission control signals EM1*i* and EM2*i* may have a high level during the deactivation section NEP and a low level during the activation section EP. However, the present disclosure is not limited thereto. For example, when the fifth and seventh transistors T5 and T7 are N-type transistors, each of the first and second emission control signals EM1*i* and EM2*i* may have a low level during the deactivation section NEP and may have a high level during the activation section EP.

In the holding frame HF, each of the first and second emission control signals EM1*i* and EM2*i* includes the deactivation section NEP and the activation section EP.

During the writing frame WF, the first to third scan signals SS1_Ai, SS2_Ai, and SS3_Ai may be activated within the deactivation section NEP of the first and second emission control signals EM1*i* and EM2*i*. The first and second scan signals SS1_Ai and SS2_Ai may be simultaneously activated, and an activation section of the first and second scan signals SS1_Ai and SS2_Ai is defined as a first activation section AP1. An activation section of the third scan signal SS3_Ai is defined as a second activation section AP2. In an embodiment, the third scan signal SS3_Ai is activated before the first and second scan signals SS1_Ai and SS2_Ai. Each of the first activation section AP1 and the second activation section AP2 may have a duration of 2H. In this embodiment, 1H may be the same duration as a value obtained by dividing the first frequency by the number (e.g., 'n') of the total low frequency scan lines SL_A1 to SL_An (refer to FIG. 1).

In an embodiment, the first activation section AP1 and the second activation section AP2 do not overlap each other in time. In detail, the second activation section AP2 may be generated before the first activation section AP1 by at least 2H. For example, the second activation section AP2 may start at a time that is a duration of 2H before a time at which the first activation section AP1 starts.

During the writing frame WF and the holding frame HF, the fourth and fifth scan signals SS4_Bi and SS5_Bi may be activated within the deactivation section NEP of the first and second emission control signals EM1*i* and EM2*i*. The fourth and fifth scan signals SS4_Bi and SS5_Bi may be simultaneously activated, and an activation section of the fourth and fifth scan signals SS4_Bi and SS5_Bi may be referred to as a third activation section. As an example of the present disclosure, the third activation section may include a first sub-activation section SAP1 and a second sub-activation section SAP2. The first sub-activation section SAP1 may occur before the second sub-activation section SAP2. As an example of the present disclosure, the first sub-activation section SAP1 may overlap the second activation section AP2. The first sub-activation section SAP1 may have a duration of 2H equal to the duration of the second activation section AP2. The deactivation section NAP is provided between the first sub-activation section SAP1 and the second sub-activation section SAP2, and the deactivation section NAP may overlap the first activation section AP1. The second sub-activation section SAP2 may have a duration of 2H equal to the duration of the first sub-activation section SAP1.

In the second driving mode, the first and second scan signals SS1_Ai and SS2_Ai have a first period TP1, the third scan signal SS3_Ai has a second period TP2, and the fourth and fifth scan signals SS4_Bi and SS5_Bi have a third period TP3. In this embodiment, the first period TP1 may be the same as the second period TP2, and the third period TP3 may be less than the first and second periods TP1 and TP2. The first and second emission control signals EM1*i* and EM2*i* have a fourth period TP4. In this embodiment, the fourth period TP4 may be the same as the third period TP3.

Referring to FIGS. 3A and 4, when the third scan signal SS3_Ai having a low level is provided to the pixel PXij during the second activation section AP2 of the writing frame WF, the fourth transistor T4 is turned on in response to the third scan signal SS3_Ai. The reference voltage Vref is transferred to the first node Na through the turned-on fourth transistor T4, and the first node Na is initialized by the reference voltage Vref.

When the fourth and fifth scan signals SS4_Bi and SS5_Bi having a low level are provided to the pixel PXij during the first sub-activation section SAP1, the sixth transistor T6 is turned on in response to the fourth scan signal SS4_Bi, and the eighth transistor T8 is turned on in response to the fifth scan signal SS5_Bi. The first driving voltage ELVDD is transferred to the second node Nb through the turned-on sixth transistor T6. The second node Nb is initialized by the first driving voltage ELVDD. The reference voltage Vref is transferred to the anode of the light emitting element ED through the turned-on eighth transistor T8, and then the anode of the light emitting element ED is initialized by the reference voltage Vref.

Referring to FIGS. 3B and 4, when first and second scan signals SS1_Ai and SS2_Ai having a low level are provided to the pixel PXij during the first activation section AP1, the second transistor T2 is turned on in response to the first scan signal SS1_Ai, the third transistor T3 is turned on in response to the second scan signal SS2_Ai. The data signal Dj is transferred to the second node Nb through the turned-on second transistor T2. Accordingly, a potential of the second node Nb is changed from the first driving voltage ELVDD to the data voltage Vdata.

Meanwhile, the first transistor T1 is diode-connected by the turned-on third transistor T3. Accordingly, a potential "Va" of the first node Na is changed from the reference voltage Vref to "Va=ELVDD-Vth". In this embodiment, "Vth" may be a threshold voltage of the first transistor T1. The first activation section AP1 of the first and second scan signals SS1_Ai and SS2_Ai has a duration of 2H. Even when the display device DD is driven at a high speed, since the first activation section AP1 has the duration of 2H, a period for compensating for the potential "Va" of the first node Na may be sufficiently secured.

Referring to FIGS. 3C and 4, when the fourth and fifth scan signals SS4_Bi and SS5_Bi having a low level are provided to the pixel PXij during the second sub-activation section SAP2, the sixth transistor T6 is turned on in response to the fourth scan signal SS4_Bi, and the eighth transistor T8 is turned on in response to the fifth scan signal SS5_Bi. The first driving voltage ELVDD is transferred to the second node Nb through the turned-on sixth transistor T6. Accordingly, a potential of the second node Nb is changed from the data voltage Vdata to the first driving voltage ELVDD. That is, when defining a potential change amount of the second node Nb as "ΔV", "ΔV=Vdata-ELVDD" is satisfied.

The potential change amount "ΔV" of the second node Nb may be reflected in the potential "Va" of the first node Na by the coupling operation of the capacitor Cc. That is, the potential "Va" of the first node Na may be changed to "ELVDD-Vth-ΔV". The potential "Va" of the first node Na may satisfy "Va=2×ELVDD-Vth-Vdata". When the potential "Va" of the first node Na satisfies the above relationship, a gate-source voltage of the first transistor T1 may increase.

This dependence of the threshold voltage "Vth" with respect to the gate-source voltage may be referred to as hysteresis of the first transistor T1. However, when the gate-source voltage of the first transistor T1 increases, a portion occupied by the threshold voltage "Vth" of the first transistor T1 decreases, so that the dependence of the threshold voltage "Vth" with respect to the gate-source voltage may be reduced. That is, a hysteresis characteristic of the first transistor T1 may be reduced.

Depending on the hysteresis characteristic of the first transistor T1, the driving current of the first transistor T1 may be affected by the data signal Dj applied in a previous writing frame. In detail, when the data signal Dj for displaying an image of a target grayscale is provided in a current writing frame after a previous data signal for displaying an image of a low grayscale is applied in a previous writing frame, an image with a grayscale higher than the target grayscale of the current writing frame may be displayed through the light emitting element ED. In addition, when the data signal Dj for displaying an image of the target grayscale is provided in the current writing frame after the previous data signal for displaying an image of a high grayscale is applied in the previous writing frame, an image of a grayscale lower than the target grayscale of the current frame may be displayed through the light emitting element ED.

When a driving frequency of the display device DD is high, a change in luminance depending on the hysteresis characteristic of the first transistor T1 may not be perceived by the user since a change period of the data signal Dj is fast. However, as the driving frequency of the display device DD decreases, the change period of the data signal Dj becomes longer, so that a change in luminance depending on the hysteresis characteristic of the first transistor T1 may be perceived by the user. However, by increasing the gate-source voltage of the first transistor T1 according to at least one embodiment of the present disclosure, the change in luminance depending on the hysteresis characteristic may be minimized.

Thereafter, when the first and second emission control signals EM1*i* and EM2*i* are changed from a high level to a low level and enter the activation section EP, the fifth and seventh transistors T5 and T7 are turned on by the first and second emission control signals EM1*i* and EM2*i* having the low level. Then, a potential of the second node Nb of the turned-on fifth transistor T5 is initialized to the reference voltage Vref. Meanwhile, a driving current is supplied to the light emitting element ED through the turned-on seventh transistor T7 and a current flows through the light emitting element ED. Accordingly, the light emitting element ED may output light corresponding to the current.

Thereafter, even when the holding frame HF is started, the first to third scan signals SS1_Ai, SS2_Ai, and SS3_Ai maintain a deactivation state. Meanwhile, in the holding frame HF, the fourth and fifth scan signals SS4_Bi and SS5_Bi and the first and second emission control signals EM1*i* and EM2*i* may be activated. During the holding frame HF, the fourth and fifth scan signals SS4_Bi and SS5_Bi may be activated within the deactivation section NEP of the first and second emission control signals EM1*i* and EM2*i*.

In the holding frame HF, during the first and second sub-activation sections SAP1 and SAP2, the sixth transistor T6 is turned on in response to the fourth scan signal SS4_Bi having a low level, and the eighth transistor T8 is turned on in response to the fifth scan signal SS5_Bi having a low level. The first driving voltage ELVDD is transferred to the second node Nb through the turned-on sixth transistor T6. The second node Nb is initialized by the first driving voltage ELVDD. The reference voltage Vref is transferred to the anode of the light emitting element ED through the turned-on eighth transistor T8, and then the anode of the light emitting element ED is initialized by the reference voltage Vref.

Even when the driving frequency of the display panel DP is lowered due to the change from the first driving mode to the second driving mode, the anode of the light emitting element ED may be initialized at a fixed period by the fifth scan signal SS5_Bi having the second frequency. Accordingly, it is possible to prevent a flicker phenomenon from occurring due to a current deviation occurring at a low grayscale when the driving mode is changed.

Figure 5:
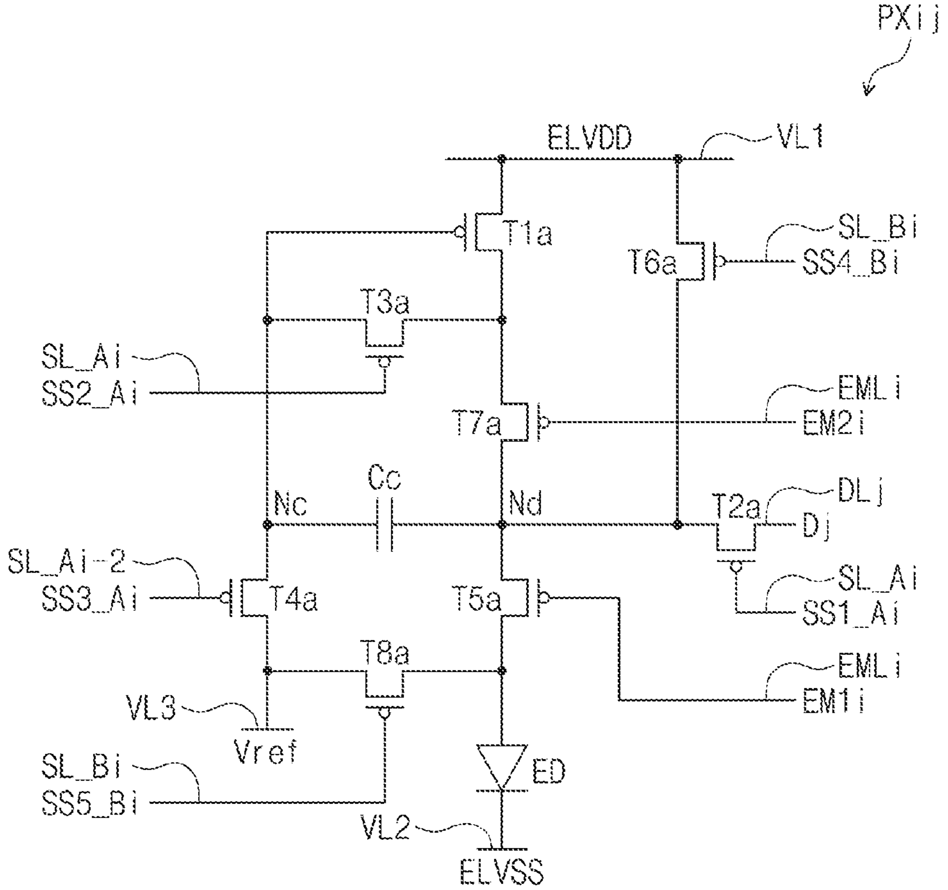
FIG. 5 is a circuit diagram of a pixel according to an embodiment of the present disclosure.

FIG. 5 is a circuit diagram of a pixel according to an embodiment of the present disclosure.

Referring to FIG. 5, the pixel PXij includes the light emitting element ED and a pixel circuit. The pixel circuit includes first to eighth transistors T1*a*, T2*a*, T3*a*, T4*a*, T5*a*, T6*a*, T7*a*, and T8*a* and one capacitor Cc. Each of the first to eighth transistors T1*a* to T8*a* may be a transistor having the LTPS semiconductor layer. The first to eighth transistors T1*a* to T8*a* may be formed of the same type of transistors. As an example of the present disclosure, each of the first to eighth transistors T1*a* to T8*a* may be a P-type transistor. The configuration of the pixel circuit according to the present disclosure is not limited to the embodiment illustrated in FIG. 5.

The first transistor T1*a* may be connected between the first power line VL1 and the anode of the light emitting element ED. The first transistor T1*a* includes a first electrode connected to the first power line VL1, a second electrode electrically connected to the anode of the light emitting element ED through the fifth and seventh transistors T5*a* and T7*a*, and a third electrode (e.g., a gate electrode) connected to a first node Nc. The first power line VL1 may transfer the first driving voltage ELVDD to the pixel PXij. The first transistor T1*a* may operate depending on a potential of the first node Nc.

The second transistor T2*a* may be connected between the data line DLj and a second node Nd. The second transistor T2*a* includes a first electrode connected to the data line DLj, a second electrode connected to the second node Nd, and a third electrode (e.g., a gate electrode) receiving the first scan signal SS1_Ai. The third electrode of the second transistor T2*a* may be electrically connected to the low frequency scan line SL_Ai. Accordingly, the second transistor T2*a* may receive the i-th low frequency scan signal transferred from the low frequency scan line SL_Ai as the first scan signal SS1_Ai. The second transistor T2*a* may be turned on in response to the first scan signal SS1_Ai to transfer the data signal Dj transferred from the data line DLj to the second node Nd. As an example of the present disclosure, the data signal Dj may be the data voltage Vdata (refer to FIG. 4) including or representing grayscale information.

The capacitor Cc is connected between the first node Nc and the second node Nd. In detail, the first electrode of the capacitor Cc is connected to the first node Nc, and the second electrode of the capacitor Cc is connected to the second node Nd.

The third transistor T3*a* is connected between the first node Nc and the first transistor T1*a*. The third transistor T3*a* includes a first electrode connected to the first node Nc, a second electrode connected to the second electrode of the first transistor T1*a*, and a third electrode (e.g., a gate electrode) receiving the second scan signal SS2_Ai. As an example of the present disclosure, the third electrode of the third transistor T3*a* may be electrically connected to the low frequency scan line SL_Ai. Accordingly, the third transistor T3*a* may receive the i-th low frequency scan signal transferred from the low frequency scan line SL_Ai as the second scan signal SS2_Ai. The third transistor T3*a* may be turned on depending on the second scan signal SS2_Ai to electrically connect the first node Nc to the second electrode of the first transistor T1*a*. The first transistor T1*a* may be diode-connected by the turned-on third transistor T3*a*.

The fourth transistor T4*a* is connected between the first node Nc and the reference voltage line VL3. The fourth transistor T4*a* includes a first electrode connected to the reference voltage line VL3, a second electrode connected to the first node Nc, and a third electrode (e.g., a gate electrode) receiving the third scan signal SS3_Ai. The reference voltage line VL3 may transfer the reference voltage Vref to the pixel PXij. The third electrode of the fourth transistor T4*a* may be electrically connected to the previous low frequency scan line SL_Ai-2. Accordingly, the fourth transistor T4*a* may receive the i-2th low frequency scan signal transferred from the previous low frequency scan line SL_Ai-2 as the third scan signal SS3_Ai. The fourth transistor T4*a* is turned on in response to the third scan signal SS3_Ai to transfer the reference voltage Vref to the first node Nc, and may perform an initialization operation for initializing the first node Nc.

The fifth transistor T5*a* is connected between the second node Nd and the anode of the light emitting element ED. The fifth transistor T5*a* includes a first electrode connected to the second node Nd, a second electrode connected to the anode of the light emitting element ED, and a third electrode (e.g., a gate electrode) receiving the first emission control signal EM1*i*. The third electrode of the fifth transistor T5*a* may be electrically connected to the emission control line EMLi. Accordingly, the fifth transistor T5*a* may receive the i-th emission control signal transferred from the emission control line EMLi as the first emission control signal EM1*i*. The fifth transistor T5*a* is turned on depending on the first emission control signal EM1*i* to electrically connect the second node Nd to the anode of the light emitting element ED.

The sixth transistor T6*a* is connected between the second node Nd and the first power line VL1. The sixth transistor T6*a* includes a first electrode connected to the first power line VL1, a second electrode connected to the second node Nd, and a third electrode (e.g., a gate electrode) receiving the fourth scan signal SS4_Bi. The third electrode of the sixth transistor T6*a* may be electrically connected to the high frequency scan line SL_Bi. Accordingly, the sixth transistor T6*a* may receive the i-th high frequency scan signal transferred from the high frequency scan line SL_Bi as the fourth scan signal SS4_Bi. The sixth transistor T6*a* may be turned on depending on the fourth scan signal SS4_Bi to apply the first driving voltage ELVDD to the second node Nd.

The seventh transistor T7*a* is connected between the first transistor T1*a* and the second node Nd. The seventh transistor T7*a* includes a first electrode connected to the second electrode of the first transistor T1*a*, a second electrode connected to the second node Nd, and a third electrode (e.g., a gate electrode) receiving the second emission control signal EM2*i*. The third electrode of the seventh transistor T7*a* may be electrically connected to the emission control line EMLi. Accordingly, the seventh transistor T7*a* may receive the i-th emission control signal transferred from the emission control line EMLi as the second emission control signal EM2*i*. The fifth and seventh transistors T5*a* and T7*a* are respectively turned on depending on the first and second emission control signals EM1*i* and EM2*i* to supply a current flowing through the first transistor T1 to the light emitting element ED.

The eighth transistor T8*a* is connected between the anode of the light emitting element ED and the reference voltage line VL3. The eighth transistor T8*a* includes a first electrode connected to the reference voltage line VL3, a second electrode connected to the anode of the light emitting element ED, and a third electrode (e.g., a gate electrode) receiving the fifth scan signal SS5_Bi. The third electrode of the eighth transistor T8*a* may be electrically connected to the high frequency scan line SL_Bi. Accordingly, the eighth transistor T8*a* may receive the i-th high frequency scan signal transferred from the high frequency scan line SL_Bi as the fifth scan signal SS5_Bi. The eighth transistor T8*a* may be turned on depending on the fifth scan signal SS5_Bi to initialize the anode of the light emitting element ED to the reference voltage Vref.

The anode of the light emitting element ED may be connected to the second electrode of the fifth transistor T5*a* and the second electrode of the eighth transistor T8*a*, and the cathode of the light emitting element ED may be connected to the second power line VL2. The second power line VL2 may transfer the second driving voltage ELVSS to the pixel PXij. In this embodiment, the reference voltage Vref may have a lower voltage level than the second driving voltage ELVSS.

Figure 6A:
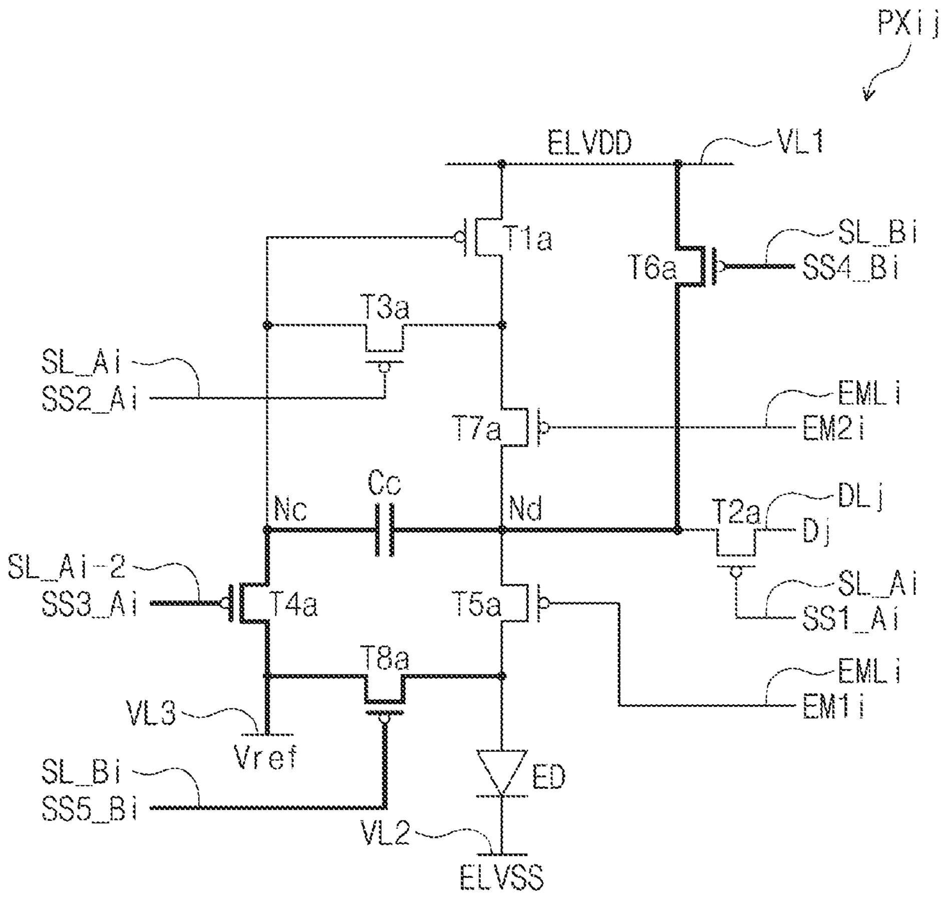
FIGS. 6A to 6C are circuit diagrams describing an operation of a pixel illustrated in FIG. 5 according to an embodiment of the present disclosure.
Figure 6B:
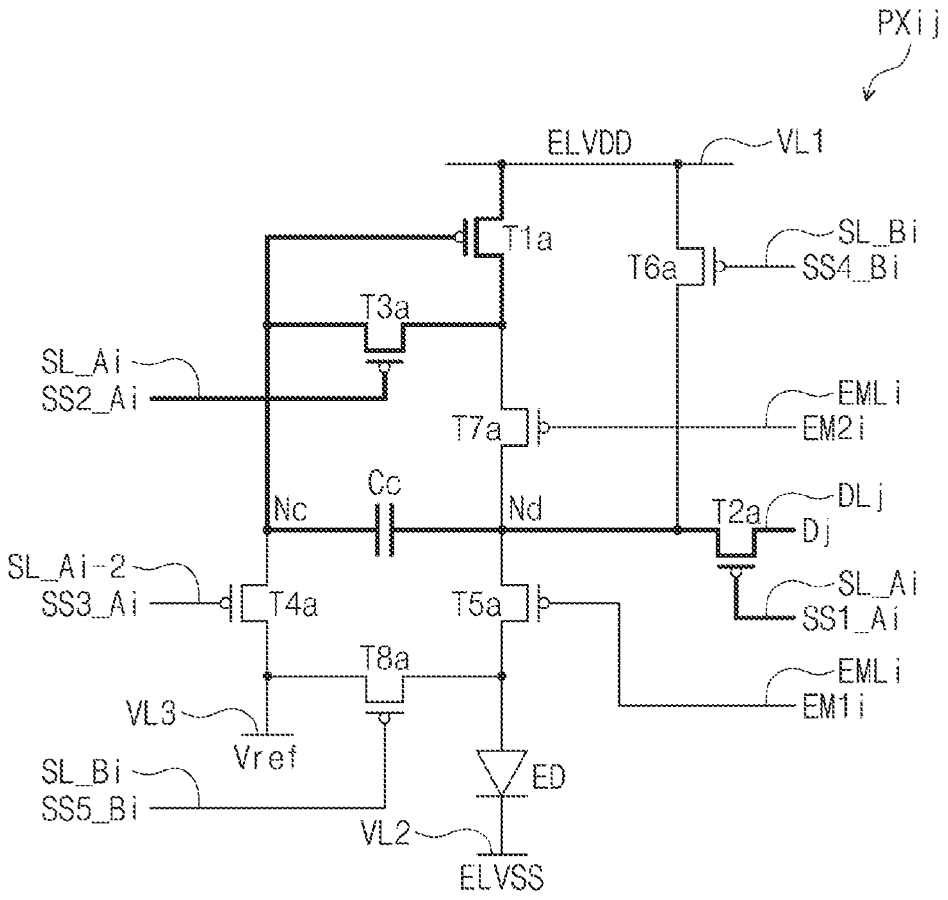
Figure 6C:
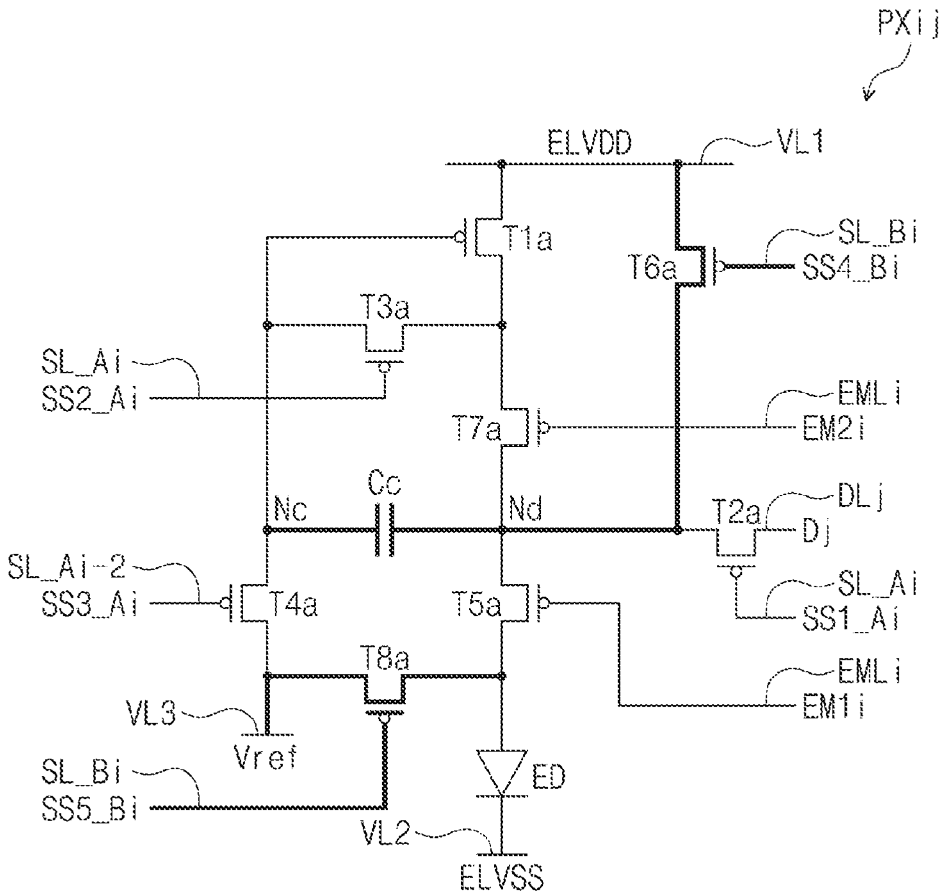

FIGS. 6A to 6C are circuit diagrams describing an operation of a pixel illustrated in FIG. 5.

Referring to FIGS. 6A and 4, during the writing frame WF, when the third scan signal SS3_Ai having a low level is provided to the pixel PXij during the second activation section AP2, the fourth transistor T4*a* is turned on in response to the third scan signal SS3_Ai. The reference voltage Vref is transferred to the first node Nc through the turned-on fourth transistor T4*a*, and the first node Nc is initialized by the reference voltage Vref.

When the fourth and fifth scan signals SS4_Bi and SS5_Bi having a low level are provided to the pixel PXij during the first sub-activation section SAP1, the sixth transistor T6*a* is turned on in response to the fourth scan signal SS4_Bi, and the eighth transistor T8*a* is turned on in response to the fifth scan signal SS5_Bi. The first driving voltage ELVDD is transferred to the second node Nd through the turned-on sixth transistor T6*a*. The second node Nd is initialized by the first driving voltage ELVDD. The reference voltage Vref is transferred to the anode of the light emitting element ED through the turned-on eighth transistor T8*a*, and the anode of the light emitting element ED is initialized by the reference voltage Vref.

Referring to FIGS. 6B and 4, when the first and second scan signals SS1_Ai and SS2_Ai having a low level are provided to the pixel PXij during the first activation section AP1, the second transistor T2*a* is turned on in response to the first scan signal SS1_Ai, the third transistor T3*a* is turned on in response to the second scan signal SS2_Ai. The data signal Dj is transferred to the second node Nd through the turned-on second transistor T2*a*. Accordingly, the potential of the second node Nd is changed from the first driving voltage ELVDD to the data voltage Vdata.

Meanwhile, the first transistor T1*a* is diode-connected by the turned-on third transistor T3*a*. Accordingly, a potential "Vc" of the first node Nc is changed from the reference voltage Vref to "Vc=ELVDD-Vth". In this embodiment, "Vth" may be the threshold voltage of the first transistor T1. The first activation section AP1 of the first and second scan signals SS1_Ai and SS2_Ai has a duration of 2H. Even when the display device DD (refer to FIG. 1) is driven at a high frequency, the first activation section AP1 has a duration of 2H, so that a period for compensating the potential Vc of the first node Nc may be sufficiently secured.

Referring to FIGS. 6C and 4, when the fourth and fifth scan signals SS4_Bi and SS5_Bi having a low level are provided to the pixel PXij during the second sub-activation section SAP2, the sixth transistor T6*a* is turned on in response to the fourth scan signal SS4_Bi and the eighth transistor T8*a* is turned on in response to the fifth scan signal SS5_Bi. The first driving voltage ELVDD is transferred to the second node Nd through the turned-on sixth transistor T6*a*. Then, a potential of the second node Nd is changed from the data voltage Vdata to the first driving voltage ELVDD. That is, when defining a potential change amount of the second node Nd as "ΔV", "ΔV=Vdata-ELVDD" is satisfied.

The potential change amount ΔV of the second node Nd may be reflected in the potential "Vc" of the first node Nc by the coupling operation of the capacitor Cc. That is, the potential "Vc" of the first node Nc may be changed to "ELVDD-Vth-AV". The potential "Vc" of the first node Nc may satisfy "Vc=2×ELVDD-Vth-Vdata". When the potential "Vc" of the first node Nc satisfies the above relationship, the gate-source voltage "Vgs" of the first transistor T1 may increase.

Thereafter, when the first and second emission control signals EM1*i* and EM2*i* are changed from a high level to a low level and enter the activation section EP, the fifth and seventh transistors T5*a* and T7*a* are turned on by the first and second emission control signals EM1*i* and EM2*i* of a low level. Then, a driving current is supplied to the light emitting element ED through the turned-on fifth transistor T5*a* and the turned-on seventh transistor T7 so that a current flows through the light emitting element ED. Accordingly, the light emitting element ED may output light corresponding to the current.

When a leakage current occurs in the third and fourth transistors Tia and T4*a*, the potential "Vc" of the first node Nc may be lowered. When the potential "Vc" of the first node Nc is lowered, an amount of current flowing through the first transistor T1*a* to the light emitting element ED may increase. The potential of the anode of the light emitting element ED may increase due to the increase in the amount of current. When the fifth transistor T5*a* is turned on, the second node Nd is electrically connected to the anode, and thus the potential of the second node Nd may also increase. In this embodiment, since the first node Nc is coupled by the capacitor Cc, when the potential of the second node Nd increases, the potential "Vc" of the first node Nc may also increase. That is, the potential of the first node Nc lowered due to the leakage current of the third and fourth transistors T3*a* and T4*a* may be compensated (i.e., may be increased) during the activation section EP, and as a result, it is possible to prevent or eliminate a flicker phenomenon that occurs when the potential "Vc" of the first node Nc is lowered.

Thereafter, even when the holding frame HF is started, the first to third scan signals SS1_Ai, SS2_Ai, and SS3_Ai maintain the deactivation state. Meanwhile, in the holding frame HF, the fourth and fifth scan signals SS4_Bi and SS5_Bi and the first and second emission control signals EM1*i* and EM2*i* may be activated. During the holding frame HF, the fourth and fifth scan signals SS4_Bi and SS5_Bi may be activated within the deactivation section NEP of the first and second emission control signals EM1*i* and EM2*i*.

In the holding frame HF, during the first and second sub-activation sections SAP1 and SAP2, the sixth transistor T6*a* is turned on in response to the fourth scan signal SS4_Bi having a low level, and the eighth transistor T8*a* is turned on in response to the fifth scan signal SS5_Bi of a low level. The first driving voltage ELVDD is transferred to the second node Nd through the turned-on sixth transistor T6*a*. The second node Nd is initialized by the first driving voltage ELVDD. The reference voltage Vref is transferred to the anode of the light emitting element ED through the turned-on eighth transistor T8*a*, and the anode is initialized by the reference voltage Vref.

Even when the driving frequency of the display panel DP is lowered due to the change from the first driving mode to the second driving mode, the anode of the light emitting element ED may be initialized at a fixed period by the fifth scan signal SS5_Bi having the second frequency. Accordingly, it is possible to prevent a flicker phenomenon from being perceived due to a current deviation occurring at a low grayscale when the driving mode is changed.

Figure 7A:
FIG. 7A is a plan view illustrating a screen of a display device operating at a normal frequency mode.
Figure 7B:
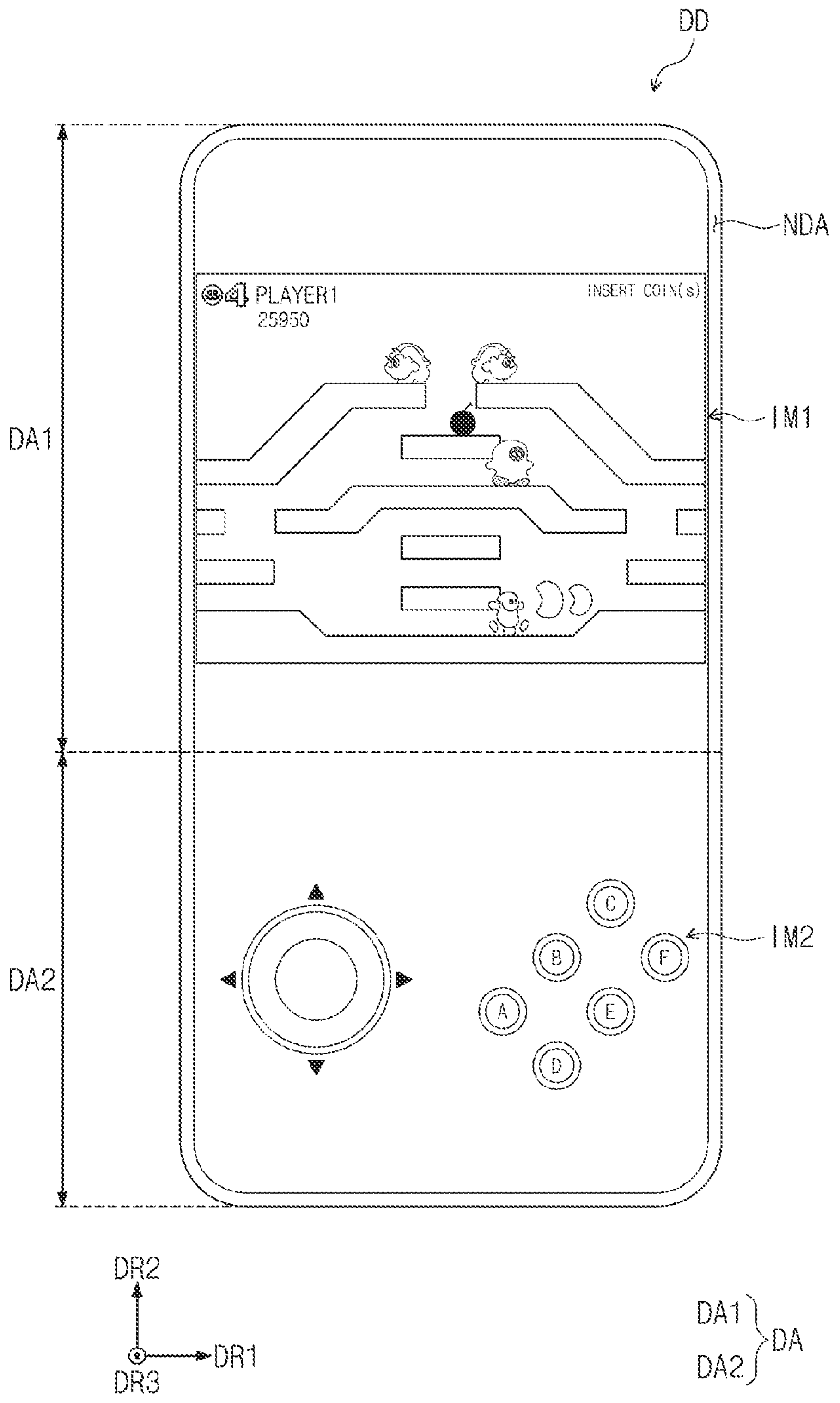
FIG. 7B is a plan view illustrating a screen of a display device operating at a multi-frequency mode.
Figure 8A:
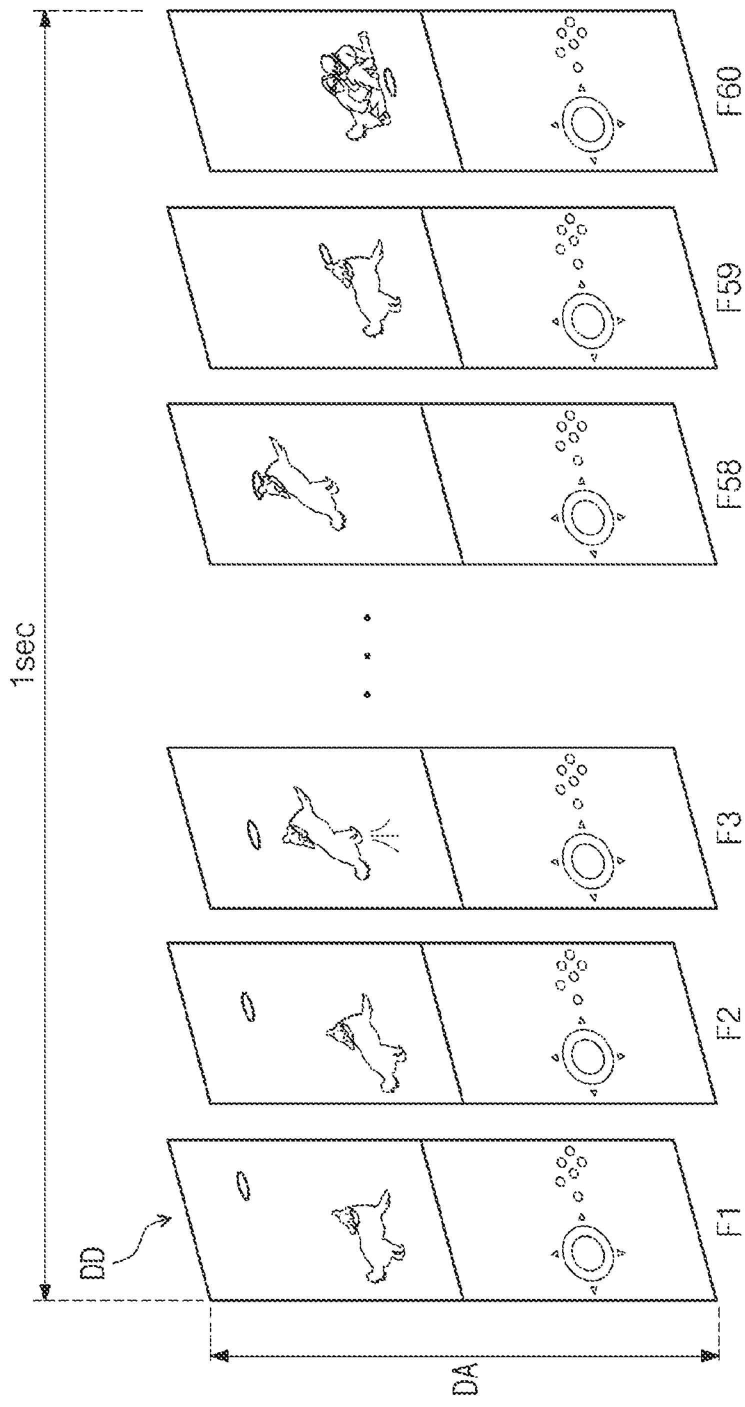
FIG. 8A is a diagram illustrating a display device operating in a normal frequency mode.
Figure 8B:
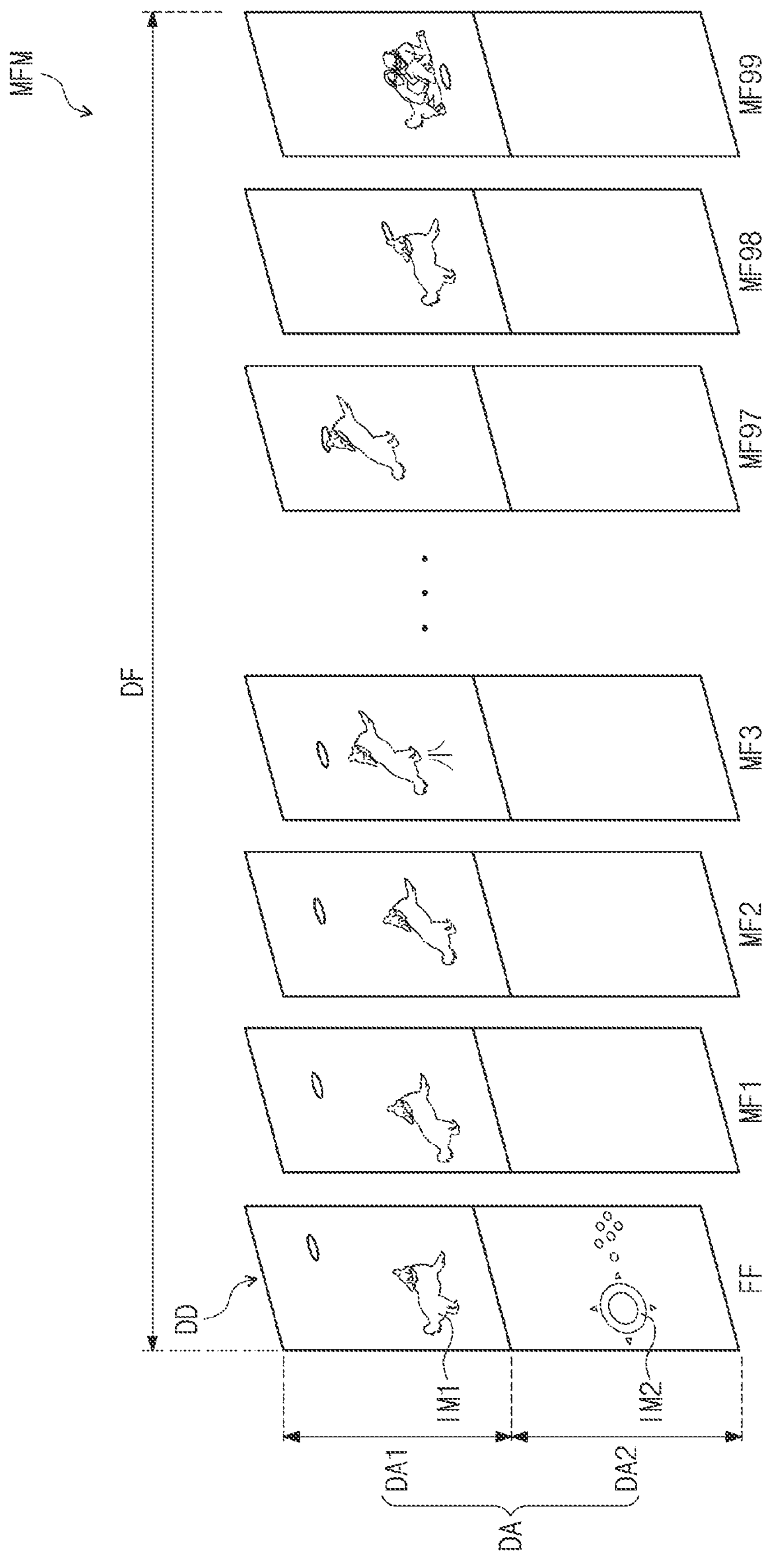
FIG. 8B is a diagram illustrating a display device operating in a multi-frequency mode.

FIG. 7A is a plan view illustrating a screen of a display device operating at a normal frequency mode, and FIG. 7B is a plan view illustrating a screen of a display device operating at a multi-frequency mode. FIG. 8A is a diagram illustrating a display device operating in a normal frequency mode, and FIG. 8B is a diagram illustrating a display device operating in a multi-frequency mode.

Referring to FIGS. 7A to 8B, the display device DD may display an image in a normal frequency mode NFM or a multi-frequency mode MFM. In the normal frequency mode NFM, the display area DA of the display device DD is not divided into a plurality of display areas having different driving frequencies. That is, in the normal frequency mode NFM, the display area DA operates at one driving frequency, and in the normal frequency mode NFM, the driving frequency of the display area DA may be defined as a normal frequency. For example, the normal frequency may be 60 Hz. In the normal frequency mode NFM, 60 images corresponding to the first frame F1 to the 60th frame F60 may be displayed on the display area DA of the display device DD for 1 second.

In the multi-frequency mode MFM, the display area DA of the display device DD is divided into a plurality of display areas having different driving frequencies. As an example of the present disclosure, in the multi-frequency mode MFM, the display area DA may include a first display area DA1 and a second display area DA2. The first and second display areas DA1 and DA2 are disposed adjacent to each other in the first direction DR1. The driving frequency (hereinafter, referred to as a first driving frequency) of the first display area DA1 may be higher than or equal to the normal frequency, and the driving frequency (hereinafter, referred to as a second driving frequency) of the second display area DA2 may be lower than the normal frequency. For example, when the normal frequency is 60 Hz, the first driving frequency may be 60 Hz, 80 Hz, 90 Hz, 100 Hz, 120 Hz, 240 Hz, or 480 Hz, etc., and the second driving frequency may be 1 Hz, 20 Hz, 30 Hz, or 40 Hz, etc. For example, the first scan driver SD1 may be used to provide the second driving frequency and the second scan driver SD2 may be used to provide the first driving frequency.

As an example of the present disclosure, the first display area DA1 may be an area in which a moving image using high-speed driving (hereinafter referred to as a first image IM1), etc. is displayed, and the second display area DA2 may be an area in which a still image that does not use high-speed driving or a text image with a long change period (hereinafter, referred to as a second image IM2) is displayed. Therefore, when a still image and a moving image are simultaneously displayed on the screen of the display device DD, by operating the display device DD at the multi-frequency mode MFM, overall power consumption may be reduced while the display quality of the moving image is increased.

Referring to FIGS. 7B and 8B, an image may be displayed during a plurality of driving frames DF in the first and second display areas DA1 and DA2 of the display device DD in the multi-frequency mode MFM. Each of the driving frames DF includes a full frame FF in which the first display area DA1 and the second display area DA2 are driven, and masking frames MF1 to MF99 in which only the first display area DA1 is driven. Each of the masking frames MF1 to MF99 may have a shorter duration than the full frame FF. The number of masking frames MF1 to MF99 included in each driving frame DF may be the same or different. Each driving frame DF may be defined as a period between the start of the current full frame FF and the start of a subsequent full frame.

As an example of the present disclosure, during each driving frame DF, the first display area DA1 may operate at 100 Hz, and the second display area DA2 may operate at 1 Hz. For example, the first scan driver SD1 may be used to operate the second display area DA2 at the 1 Hz and the second scan driver SD2 may be used to operate the first display area DA1 as the 100 Hz. In this embodiment, each driving frame DF has a duration corresponding to 1 second, and may include one full frame FF and 99 masking frames MF1 to MF99. During each driving frame DF, 100 first images IM1 corresponding to the full frame FF and 99 masking frames MF1 to MF99 are displayed on the first display area DA1 of the display device DD, and one second image IM2 corresponding to the full frame FF may be displayed on the second display area DA2.

In FIG. 8B, an embodiment in which the first driving frequency is 100 Hz and the second driving frequency is 1 Hz is illustrated as an example in the multi-frequency mode MFM for convenience of explanation, but the present disclosure is not limited thereto. For example, the first driving frequency may be 100 Hz, and the second driving frequency may be 20 Hz. In this embodiment, five first images IM1 corresponding to one full frame FF and four masking frames are displayed on the first display area DA1 of the display device DD during each driving frame DF, one second image IM2 corresponding to the full frame FF may be displayed on the second display area DA2. Also, the first driving frequency may be 90 Hz, and the second driving frequency may be 30 Hz. In this embodiment, three first images IM1 corresponding to one full frame FF and two masking frames are displayed on the first display area DA1 of the display device DD during each driving frame DF, and one second image IM2 corresponding to the full frame FF may be displayed on the second display area DA2.

Figure 9:
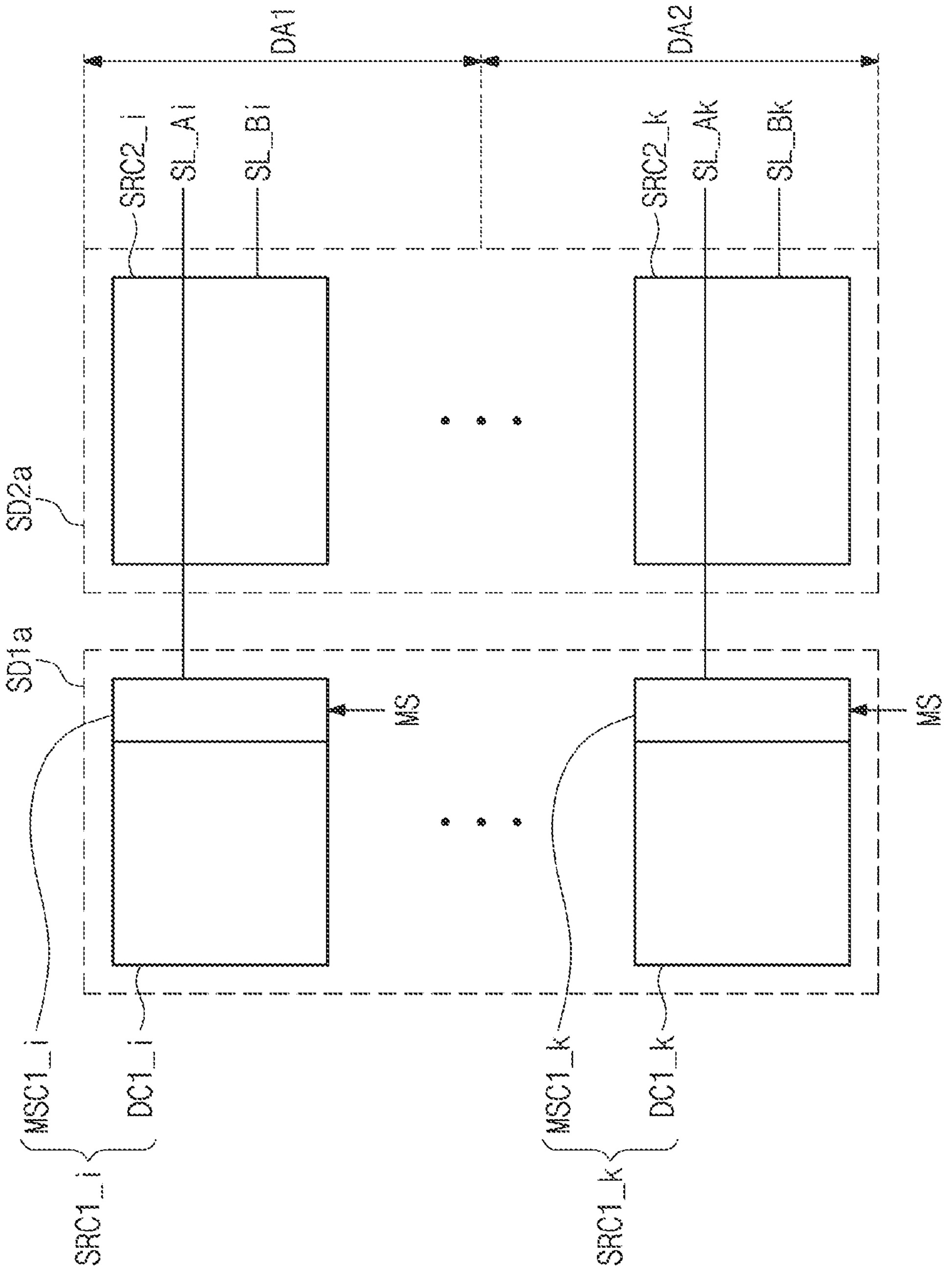
FIG. 9 is a block diagram illustrating a configuration of first and second scan drivers according to an embodiment of the present disclosure.
Figure 10:
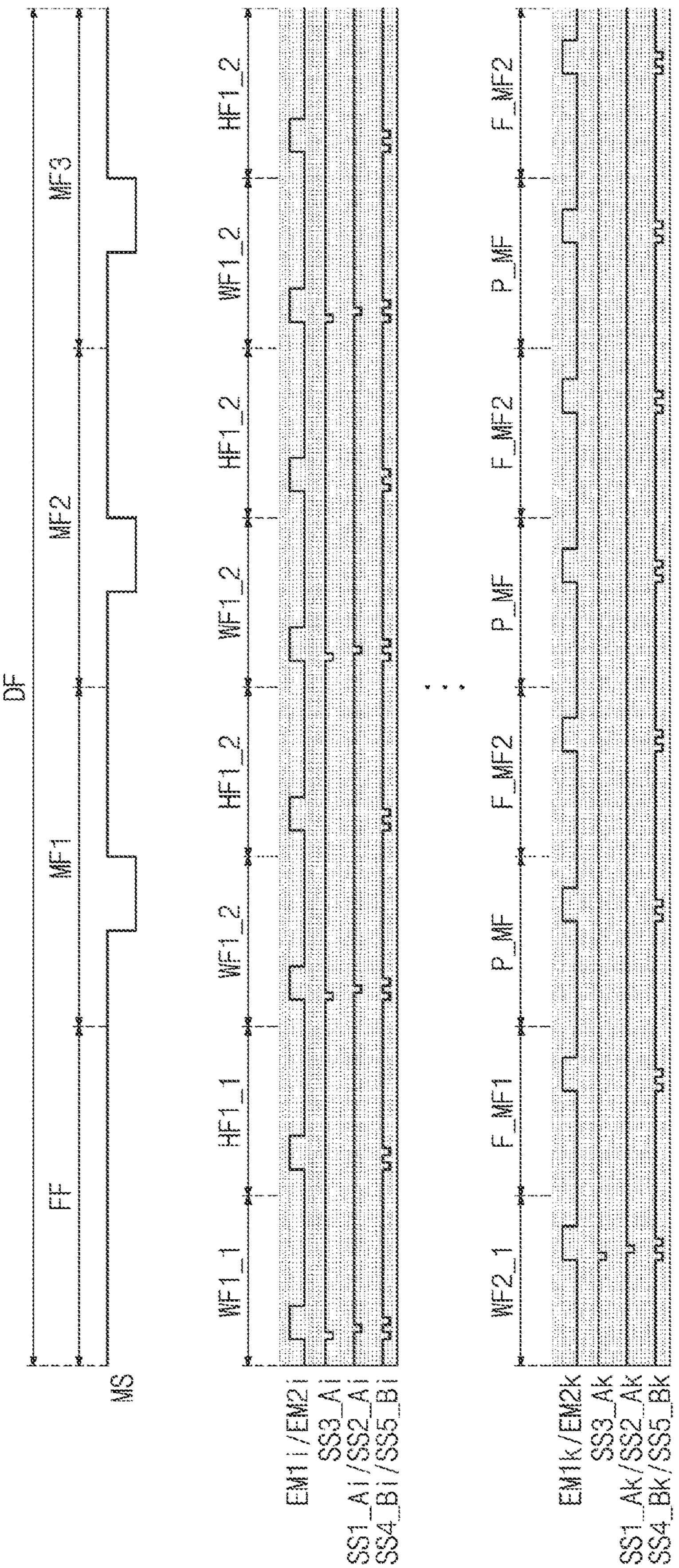
FIG. 10 is a timing diagram describing operations of first and second scan drivers illustrated in FIG. 9 according to an embodiment of the present disclosure.

FIG. 9 is a block diagram illustrating a configuration of first and second scan drivers according to an embodiment of the present disclosure, and FIG. 10 is a timing diagram describing operations of first and second scan drivers illustrated in FIG. 9.

Referring to FIG. 9, a first scan driver SD1*a* operates at a first frequency, and a second scan driver SD2*a* operates at a second frequency higher than the first frequency. The first scan driver SD1*a* may be used to implement the first scan driver SD1 of FIG. 1 and the second scan driver SD2*a* may be used to implement the second scan driver SD2 of FIG. 1. In the normal frequency mode NFM (refer to FIGS. 7A and 8A), the first frequency may have the same frequency as the normal frequency, and the second frequency may have a higher frequency than the normal frequency. For example, when the normal frequency is 60 Hz, the first frequency may be 60 Hz, and the second frequency may be the highest frequency that the first driving frequency may have, for example, 240 Hz or 480 Hz.

In the multi-frequency mode MFM (refer to FIGS. 7B and 8B), the first frequency may have the same frequency as the first driving frequency, and the second frequency may have a frequency equal to or higher than the first driving frequency. The second driving frequency may have a lower frequency than the first frequency. For example, when the first driving frequency is 60 Hz and the second driving frequency is 30 Hz, the first frequency may be 60 Hz and the second frequency may be 120 Hz.

The first scan driver SD1*a* includes a plurality of low frequency driving stages SRC1_*i* to SRC1_*k*. Each of the low frequency driving stages SRC1_*i* to SRC1_*k* may output a low frequency scan signal to a corresponding low frequency scan line. Each of the low frequency driving stages SRC1_*i* to SRC1_*k* receives the first scan control signal SCS1 from the driving controller 100 illustrated in FIG. 1. For example, the first scan control signal SCS1 includes a start signal, a plurality of clock signals, and a masking signal MS. The masking signal MS may be a signal for masking the low frequency scan signals supplied to the second display area DA2 to a predetermined level. As an example of the present disclosure, the masking signal MS may be provided to each of the low frequency driving stages SRC1_*i* to SRC1_*k*.

Each of the low frequency driving stages SRC1_*i* to SRC1_*k* includes low frequency driving circuits DC1_*i* and DC1_*k* generating the low frequency scan signals and low frequency masking circuits MSC1_*i* and MSC1_*k* connected to the low frequency driving circuits DC1_*i* and DC1_*k*. Among the low frequency driving stages SRC1_*i* to SRC1_*k*, an *i*-th low frequency driving stage SRC1_*i* is connected to the *i*-th low frequency scan line SL_Ai, and a *k*-th low frequency driving stage SRC1_*k* is connected to the *k*-th low frequency scan line SL_Ak.

The low frequency driving circuits DC1_*i* and DC1_*k* may operate at the first frequency to output the low frequency scan signals. The low frequency masking circuits MSC1_*i* and MSC1_*k* selectively mask the low frequency scan signal to a predetermined level in response to the masking signal MS. That is, the low frequency scan signals may be maintained at a high level during the activation section of the masking signal MS to be deactivated.

The second scan driver SD2*a* includes a plurality of high frequency driving stages SRC2_*i* to SRC2_*k*. Each of the high frequency driving stages SRC2_*i* to SRC2_*k* may output a high frequency scan signal to a corresponding high frequency scan line. Each of the high frequency driving stages SRC2_*i* to SRC2_*k* receives the second scan control signal SCS2 from the driving controller 100 illustrated in FIG. 1. For example, the second scan control signal SCS2 includes a start signal and a plurality of clock signals.

The *i*-th high frequency driving stage SRC2_*i* among the high frequency driving stages SRC2_*i* to SRC2_*k* is connected to the *i*-th high frequency scan line SL_Bi, and the *k*-th high frequency driving stage SRC2_*k* is the *k*-th high frequency scan line SL_Bk.

The high frequency driving stages SRC2_*i* to SRC2_*k* may operate at the second frequency to output the high frequency scan signal. The high frequency driving stages SRC2_*i* to SRC2_*k* may operate at the second frequency in all display areas DA1 and DA2 even in the multi-frequency mode.

Referring to FIGS. 2, 8B and 10, the driving frame DF of the display device DD in the multi-frequency mode MFM includes one full frame FF and three masking frames MF1, MF2, and MF3. The number of masking frames MF1, MF2, and MF3 included in the driving frame DF may vary depending on the first and second driving frequencies. As an example of the present disclosure, the first driving frequency may be 60 Hz, and the second driving frequency may be 15 Hz. The first scan driver SD1*a* may operate at the first frequency, and the second scan driver SD2*a* may operate at the second frequency. As an example of the present disclosure, the first frequency may be 60 Hz, and the second frequency may be 120 Hz.

The full frame FF with respect to the first display area DA1 may include a first writing frame WF1_1 and a first holding frame HF1_1. Each of the masking frames MF1 to MF3 with respect to the first display area DA1 may include a second writing frame WF1_2 and a second holding frame HF1_2.

The first and second scan drivers SD1*a* and SD2*a* are activated during the first and second writing frames WF1_1 and WF1_2. Accordingly, each of the first to fifth scan signals SS1_Ai, SS2_Bi, SS3_Bi-1, SS4_Ai, and SS5_Bi supplied to the pixel disposed in the first display area DA1 may be activated. During the first and second holding frames HF1_1 and HF1_2, the first scan driver SD1*a* is deactivated and the second scan driver SD2*a* is activated. Accordingly, each of the first to third scan signals SS1_Ai, SS2_Ai, and SS3_Ai supplied to the pixel disposed in the first display area DA1 during the first and second holding frames HF1_1 and HF1_2 may be deactivated, while the fourth and fifth scan signals SS4_Ai and SS5_Ai may be activated.

Meanwhile, the full frame FF with respect to the second display area DA2 may include a third writing frame WF2_1 and a first full masking frame F_MF1. Each of the masking frames MF1 to MF3 with respect to the second display area DA2 may include a partial masking frame P_MF and a second full masking frame F_MF2.

In the multi-frequency mode MFM, the masking signal MS may be maintained at the first level during the third writing frame WF2_1 and the first and second full masking frames F_MF1 and F_MF2. That is, the masking signal MS may be deactivated during the third writing frame WF2_1, the first and second full masking frames F_MF1 and F_MF2, and may be activated within the partial masking frame P_MF.

Even when the third writing frame WF2_1 ends and the first full masking frame F_MF1 starts, the masking signal MS maintains the first level during the first full masking frame F_MF1. Thereafter, when the partial masking frame P_MF1 starts, the masking signal MS changes from the first level to the second level (e.g., a low level) in synchronization with a start time of the second display area DA2 driven at the second driving frequency. The masking signal MS may maintain the second level until the partial masking frame P_MF1 ends. When the second full masking frame F_MF2 starts, the masking signal MS changes from the second level to the first level and maintains the first level during the second full masking frame F_MF2.

Meanwhile, the second scan drivers SD2*a* may maintain the activation state even in the first and second full masking frames F_MF1 and F_MF2 and the partial masking frame P_MF. The fourth and fifth scan signals SS4_Bi and SS5_Bi disposed in the first display area DA1 may be generated at the same frequency as fourth and fifth scan signals SS4_Bk and SS5_Bk supplied to the pixel disposed in the second display area DA2.

Accordingly, even when the second display area DA2 operates at the second driving frequency lower than the first driving frequency, the fourth and fifth scan signals SS4_Bi and SS5_Bi may be activated at the second frequency equal to or higher than the first driving frequency. Accordingly, the eighth transistor T8 or T8*a* may be turned on by the fourth and fifth scan signals SS4_Bi and SS5_Bi, and the reference voltage Vref may be applied to the anode of the light emitting element ED. Accordingly, an issue where the luminance of the light emitting element ED decreases in the masking frames MF1 to MF3 may be mitigated.

In FIGS. 9 and 10, a structure in which the low frequency masking circuits MSC1_*i* and MSC1_*k* are provided in each of the low frequency driving stages SRC1_*i* to SRC1_*k* are illustrated as an example, but the present disclosure is not limited to the structure including the masking circuit. For example, by controlling an input of a control signal (e.g., a clock signal, etc.) input to each of the low frequency driving stages SRC1_*i* to SRC1_*k*, an effect of masking the output of the low frequency scan signal may be achieved. In this embodiment, each of the low frequency driving stages SRC1_*i* to SRC1_*k* does not include the low frequency masking circuits MSC1_*i* and MSC1_*k*.

According to an embodiment of the present disclosure, an activation section of a scan signal has a duration of 2H even when a display device is driven at high speed, so that a period for compensating for a potential of the first node connected to a gate of a first transistor may be sufficiently secured. Also, by increasing a gate-source voltage of the first transistor, it is possible to minimize the change in luminance due to the hysteresis characteristic.

In addition, according to an embodiment of the present disclosure, a scan signal for initializing the anode of the light emitting element to the reference voltage is generated at the same frequency as the highest frequency among panel frequencies at which the display panel can operate. Accordingly, it is possible to prevent a flicker phenomenon from being perceived due to a current deviation in the light emitting element, which is generated at a low grayscale when the driving mode is changed.

While the present disclosure has been described with reference to embodiments thereof, it will be apparent to those of ordinary skill in the art that various changes and modifications may be made thereto without departing from the spirit and scope of the present disclosure as set forth in the following claims.

What is claimed is:

1. A display device comprising:

a display panel including a pixel, wherein the pixel includes:

a light emitting element ED;

a first transistor connected between a power line and the light emitting element and configured to operate depending on a potential of a first node;

a second transistor connected between a data line and a second node and configured to receive a first scan signal;

a capacitor connected between the first node and the second node;

a third transistor connected between the first transistor and the first node and configured to receive a second scan signal;

a fourth transistor connected between the first node and a reference voltage line and configured to receive a third scan signal;

a fifth transistor connected between the second node and the reference voltage line and configured to receive a first emission control signal; and a sixth transistor connected between the power line and the second node and configured to receive a fourth scan signal, wherein an activation section of the fourth scan signal includes a first sub-activation section and a second sub-activation section, the first sub-activation section of the fourth scan signal overlaps an activation section of the third scan signal and the second sub-activation section of the fourth scan signal non-overlaps the activation section of the third scan signal.

2. The display device of claim 1, wherein frequencies of the fourth scan signal and the first emission control signal are higher than frequencies of the first to third scan signals.

3. The display device of claim 2, wherein the display panel displays an image during a plurality of frame periods, and each frame period includes a writing period and a holding period, wherein the first to fourth scan signals and the first emission control signal are activated in the writing period, wherein the fourth scan signal and the first emission control signal are activated in the holding period, and wherein the first to third scan signals are deactivated in the holding period.

4. The display device of claim 3, wherein the first sub-activation section is generated before the second sub-activation section, and wherein, in the writing period, the first sub-activation section of the fourth scan signal overlaps the activation section of the third scan signal, and in the holding period, the first sub-activation section of the fourth scan signal non-overlaps the activation section of the third scan signal.

5. The display device of claim 3, wherein a deactivation section of the first emission control signal overlaps activation sections of the first to fourth scan signals.

6. The display device of claim 4, wherein the fourth scan signal further includes a deactivation section disposed between the first and second sub-activation sections, and wherein, in the writing period, the deactivation section of the fourth scan signal overlaps activation sections of the first and second scan signals.

7. The display device of claim 6, wherein the first and second scan signals are activated at a same time.

8. The display device of claim 1, wherein the pixel further includes a seventh transistor connected between the light emitting element and the first transistor, and configured to receive a second emission control signal.

9. The display device of claim 8, wherein the first and second emission control signals are deactivated at a same time.

10. The display device of claim 8, wherein the pixel further includes an eighth transistor connected between the light emitting element and the reference voltage line and configured to receive a fifth scan signal.

11. The display device of claim 10, wherein the fifth scan signal is activated simultaneously with the fourth scan signal.

12. The display device of claim 1, wherein the pixel further includes a seventh transistor connected between the second node and the first transistor, and configured to receive a second emission control signal.

13. The display device of claim 12, wherein the fifth transistor includes:

a first electrode connected to the second node;

a second electrode connected to the light emitting element; and a third electrode receiving the first emission control signal, and wherein the first and second emission control signals are deactivated at a same time.

14. The display device of claim 13, wherein the pixel further includes an eighth transistor connected between the light emitting element and the reference voltage line and configured to receive a fifth scan signal.

15. The display device of claim 14, wherein the fifth scan signal is activated simultaneously with the fourth scan signal.

16. The display device of claim 1, further comprising:

a first scan driver operating at a first frequency and outputting the first to third scan signals; and a second scan driver operating at a second frequency higher than the first frequency and outputting the fourth scan signal.

17. The display device of claim 16, further comprising an emission control driver operating at a third frequency higher than the first frequency and outputting the first emission control signal.

18. The display device of claim 17, wherein the second frequency has a same magnitude as the third frequency.

19. The display device of claim 1, wherein the pixel further includes a seventh transistor connected between the light emitting element and the first transistor, and configured to receive a second emission control signal.

20. The display device of claim 19, wherein the pixel further includes an eighth transistor connected between the light emitting element and the reference voltage line and configured to receive a fifth scan signal.

21. A display device comprising:

a display panel including a pixel, wherein the pixel includes:

a light emitting element;

a first transistor connected between a power line and the light emitting element and configured to operate depending on a potential of a first node;

a second transistor connected between a data line and a second node and configured to receive a first scan signal;

a capacitor connected between the first node and the second node;

a third transistor connected between the first transistor and the first node and configured to receive a second scan signal;

a fourth transistor connected between the first node and a reference voltage line and configured to receive a third scan signal;

a fifth transistor connected between the second node and the reference voltage line and configured to receive a first emission control signal; and a sixth transistor connected between the power line and the second node and configured to receive a fourth scan signal, wherein frequencies of the fourth scan signal and the first emission control signal are higher than frequencies of the first to third scan signals.

22. The display device of claim 21, wherein the pixel further includes a seventh transistor connected between the second node and the first transistor, and configured to receive a second emission control signal.

23. A display device comprising:

a first scan driver operating at a first frequency and outputting first to third scan signals;

a second scan driver operating at a second frequency higher than the first frequency and outputting a fourth scan signal; and a display panel including a pixel, wherein the pixel includes:

a light emitting element;

a first transistor connected between a power line and the light emitting element and configured to operate depending on a potential of a first node;

a second transistor connected between a data line and a second node and configured to receive a first scan signal;

a capacitor connected between the first node and the second node;

a third transistor connected between the first transistor and the first node and configured to receive the second scan signal;

a fourth transistor connected between the first node and a reference voltage line and configured to receive the third scan signal;

a fifth transistor connected between the second node and the reference voltage line and configured to receive a first emission control signal; and a sixth transistor connected between the power line and the second node and configured to receive the fourth scan signal.

24. The display device of claim 23, further comprising an emission control driver operating at a third frequency higher than the first frequency and outputting the first emission control signal.

25. The display device of claim 24, wherein the second frequency has a same magnitude as the third frequency.

* * * * *